US006188486B1

(12) United States Patent
Yamada

(10) Patent No.: US 6,188,486 B1
(45) Date of Patent: *Feb. 13, 2001

(54) PRINTING METHOD AND PRINTING SYSTEM

(75) Inventor: Satoru Yamada, Tokyo (JP)

(73) Assignee: Canon Aptex Inc., Ibaraki (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/874,457

(22) Filed: Jun. 16, 1997

(30) Foreign Application Priority Data

| Jun. 18, 1996 | (JP) | 8-156803 |
| Jun. 18, 1996 | (JP) | 8-156813 |
| Jun. 18, 1996 | (JP) | 8-156820 |
| Jun. 18, 1996 | (JP) | 8-156822 |

(51) Int. Cl.[7] .................................................. H04N 1/419
(52) U.S. Cl. ........................... 358/1.15; 358/1.2; 358/1.9
(58) Field of Search .......................... 395/114, 115–118, 395/102, 109, 200.77, 500.45, 500.48; 382/202; 347/14–15, 45–47, 65–66, 5–7, 9–10, 16–17, 42–44, 224; 358/1.2, 1.6, 1.9, 1.8, 1.13–1.18, 500, 502, 298, 296–304; 709/223

(56) References Cited

U.S. PATENT DOCUMENTS

| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,516,139 | * 5/1985 | Takiguchi | 347/15 |
| 4,558,333 | 12/1985 | Sugitani et al. | 347/65 |
| 4,608,577 | 8/1986 | Hori | 347/66 |
| 4,723,129 | 2/1988 | Endo et al. | 347/45 |
| 4,740,796 | 4/1988 | Endo et al. | 347/56 |
| 5,220,674 | * 6/1993 | Morgan et al. | 709/223 |
| 5,289,210 | 2/1994 | Takayanagi | 347/14 |
| 5,450,571 | * 9/1995 | Rosekrans et al. | 395/500.45 |
| 5,619,623 | * 4/1997 | Takayanagi et al. | 358/1.15 |
| 5,699,102 | * 12/1997 | Ng et al. | 347/224 |
| 5,734,391 | * 3/1998 | Tanaka et al. | 347/14 |

FOREIGN PATENT DOCUMENTS

| 0 645 245 | 3/1995 | (EP) | B41J/2/205 |
| 54-56847 | 5/1979 | (JP) | B41M/5/26 |
| 59-123670 | 7/1984 | (JP) | B41J/3/04 |
| 59-138461 | 8/1984 | (JP) | B41J/3/04 |
| 60-71260 | 4/1985 | (JP) | B41J/3/04 |

OTHER PUBLICATIONS

Patent Abstracts of Japan, vol. 017, No. 695 (E–1480), Dec. 20, 1993 & JP 05 236276 A (Oko Electric Inc. Co. Ltd), Sep. 10, 1993.
Patent Abstracts of Japan, vol. 097, No. 003, Mar. 31, 1997 & JP 08 289161 A (NEC Corp), Nov. 1, 1996.
Patent Abstracts of Japan, vol. 016, No. 377 (P–1401), Aug. 12, 1992 & JP 04 119367 A (NEC Off Syst Ltd), Apr. 19, 1994.
Patent Abstracts of Japan, vol. 018, No. 383 (M–1640), Jul. 19, 1994 & JP 06 106764 A (TDK Corp), Apr. 19, 1994.
IBM Technical Disclosure Bulletin, vol. 33, No. 5, Oct. 1, 1990, pp. 30–31, XP000107364 "Dynamic Printer Definition".

* cited by examiner

Primary Examiner—Leo H. Boudreau
Assistant Examiner—Ishrat Sherali
(74) Attorney, Agent, or Firm—Fitzpatrick, Cella, Harper & Scinto

(57) ABSTRACT

Printers selectively connected to a computer terminal device is identified. By controlling the printer using a dedicated correction data, a quality of the printing image is improved. As an identification data of the printer connected to the computer terminal device, a printer ID is checked. By reading the correction data corresponding to the printer ID, the head shading process is performed for the printer connected to the computer terminal device using the correction data.

45 Claims, 29 Drawing Sheets

PRINTING METHOD AND PRINTING SYSTEM

BACKGROUND OF THE INVENTION

1. Field of the Invention

The present invention relates to a printing method and a printing system for printing an image on a printing medium under control by a control unit.

2. Description of the Related Art

In general, in a printer employing a printing head ejecting an ink from ink passages forming a plurality of nozzles, it is possible to cause density fleck in a printed image due to adverse effect of fine fluctuation of shapes of the ink passage forming the nozzles or to variation of ejection amount of the ink as printing material. One of the correction methods to make such density fleck not perceptible is called as head shading (HS).

FIG. 8 is a general block diagram showing a system actually performing head shading. Hereinafter, at first, the conventional head shading technology in the case where three systems of reading, image processing and printing are constructed in a single apparatus.

In FIG. 8, an original exposure system 801 is a portion performing reading of an original, forms a portion of reading a result of printing necessary for performing head shading. An image processing portion 802 serves as a portion performing arithmetic operation and the like with respect to the image read by the original exposure system 801. The arithmetic operation performed in the image processing portion 802 includes color processing, binarizing process, head shaping and so on. An image forming portion 803 is a portion for printing an image read by the original exposure system 801 and processed by the image processing portion 802. The image forming portion 803 includes printing heads 804 to 807 for printing the images. In the shown example, 804 denotes a head for ejecting a black ink, 805 denotes a head for ejecting a cyan ink, 806 denotes a head for ejecting a magenta ink and 807 denotes a head for ejecting a yellow ink.

In the printer constructed as set forth above, in order to check output characteristics of respective of the printing heads 804 to 807 in the image forming portion 803, printing of the predetermined test pattern is performed so that an image of the predetermined density is formed by respective of the printing heads 804 to 807. Then, the resultant print is read by the original exposure system 801. A read data read by the original exposure system 801 is used for forming a HS data 808 in the image processing portion 802. The HS data is data for correcting output density of ink per ink passage forming a plurality of nozzles in respective of the printing heads 804 to 807. The HS data 808 is used as a correction data for the image data input from the original exposure system 801 so as to make the density fleck not perceptible. As a result, an image avoided the density fleck is printed by the image forming portion 803.

In the printer constructed as set forth above, the original exposure system 801, the image processing portion 802 and the image forming portion 803 will never been separated individually. Therefore, a discrepancy such as that explained later, will never be caused between the characteristics of the printing heads 804 to 807 in the image forming portion 803 and the HS data 808.

On the other hand, in a printing system, in which a reader device 3, a computer terminal device 2 which can perform image processing and transmission, and a printer 1 are mutually independent, and connected through connection cable 5, as shown in FIG. 1, it is possible that the printer 1 is replaced with other printer.

In the system construction as illustrated in FIG. 1, when the printer 1 connected to the computer terminal device 2 is replaced, a discrepancy is inherently arisen between the characteristics of the printer and the HS data managed by the computer terminal device 2 to make it impossible to perform appropriate data correction. Therefore, in the prior art, head shading cannot be performed in the system shown in FIG. 1.

On the other hand, in the system construction set forth above, if condition of formation of the density fleck is varied due to secular change, it is possible that the HS data cannot be adapted to the secular change of the head to make it difficult to effect appropriate data correction. Particularly, where the printer is changed, appropriate data correction cannot be performed unless the HS data corresponding to the printer and the timing where the HS data is generated, are properly managed.

SUMMARY OF THE INVENTION

It is an object of the present invention to provide a printing method and a printing system which can identify printers which are selectively connected to a control unit, and can control the selected printer with a dedicated data therefor to improve a printing image quality.

Another object of the present invention is to provide a printing method and a printing system which can avoid a problem to be caused by control of the printer with a correction data which has been obtained long ago exceeding a predetermined period, and whereby can improve a printing image quality.

In a first aspect of the present invention, there is provided a printing method for selectively connecting a plurality of printers, each having a plurality of printing elements, to a control unit, and performing printing of an image on a printing medium by controlling the connected printer by the control unit, comprising the steps of:

storing correction data relative to control per each printer available for connection with the control unit, in a storage device;

identifying the printer connected to the control unit to be controlled by the control unit, on the basis of an identification code corresponding to the printer;

reading out the correction data corresponding to the printer identified as the object for control, from the storage device; and controlling the printer to be controlled using the read out correction data.

In a second aspect of the present invention, there is provided a printing system for selectively connecting a plurality of printers, each having a plurality of printing elements, to a control unit, and performing printing of an image on a printing medium by controlling the connected printer by the control unit, comprising the steps of:

a storage device storing correction data relative to control per each printer available for connection with the control unit;

identifying means for identifying the printer connected to the control unit to be controlled by the control unit, on the basis of an identification code corresponding to the printer;

retrieving means for retrieving the correction data corresponding to the printer identified as the object for control, from the storage device; and correction means for controlling the printer to be controlled using the read out correction data.

In a third aspect of the present invention, there is provided a printing method for printing an image on a printing medium with controlling a printer by a control unit, comprising the steps of:

storing a correction data relating to control of the printer and a storage time and date, on which the correction data is stored, in a storage device;

reading out the correction data and the storage time and date upon controlling the printer, from the storage device;

controlling the printer using the correction data when an elapsed time from the storage time and date is not more than or equal to a predetermined period; and interrupting control of the printer when an elapsed time from the storage time and date is more than or equal to a predetermined period.

In a fourth aspect of the present invention, there is provided a printing method for printing an image on a printing medium with controlling a printer by a control unit, comprising the steps of:

storing a correction data relating to control of the printer and storage time and date, on which the correction data is stored, in a storage device;

reading out the correction and the storage time and date upon controlling the printer, from the storage device;

controlling the printer using the correction data when an elapsed time from the storage time and date is not more than or equal to a predetermined period; and continuing control of the printer without using the correction data when an elapsed time from the storage time and data than or equal to a predetermined period.

In a fifth aspect of the present invention, there is provided a printing system for printing an image on a printing medium with controlling a printer by a control unit, comprising:

storage device for storing a correction data relating to control of the printer and a storage time and date, on which the correction data is stored;

reading means for reading out the correction data and the storage time and date from the storage device upon controlling the printer;

means for controlling the printer using the correction data when an elapsed time from the storage time and date is not more than or equal to a predetermined period;

means for demanding resetting the correction data when an elapsed time from the storage time and date is more than equal to a predetermined period; and means for interrupting control for the printer when an elapsed time from the storage time and date is more than equal to a predetermined period.

In a sixth aspect of the present invention, there is provided a printing system for printing an image on a printing medium with controlling a printer by a control unit, comprising:

storage device for storing a correction data relating to control of the printer and a storage time and date, on which the correction data is stored;

reading means for reading out the correction data and the storage time and date from the storage device upon controlling the printer;

means for controlling the printer using the correction data when an elapsed time from the storage time and date is not more than or equal to a predetermined period; and means for continuing control of the printer without using the correction data when an elapsed time from the storage time and date is more than equal to a predetermined period.

Since the present invention identifies printers selectively connected to the control unit to read out the dedicated correction data for control the selected printer, and controls the printer with using the dedicated correction data, therefor, the selected printer can be appropriately controlled with the dedicated correction data to permit printing of high quality image with no density fleck.

Also, the present invention identifies printers selectively connected to the control unit to read out the dedicated correction data for control the selected printer, and controls the printer with using the dedicated correction data and a setting data concerning the printing condition set per the printer, therefor, the selected printer can be appropriately controlled with the dedicated correction data to permit printing of high quality image with no density fleck.

On the other hand, by recording a time and date, at which the correction data is derived, it becomes possible to avoid a potential problem which may be caused in control using the correction data, about which a period longer than or equal to the predetermined period has past.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to be present invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscure the present invention.

First Embodiment

Figure 1:
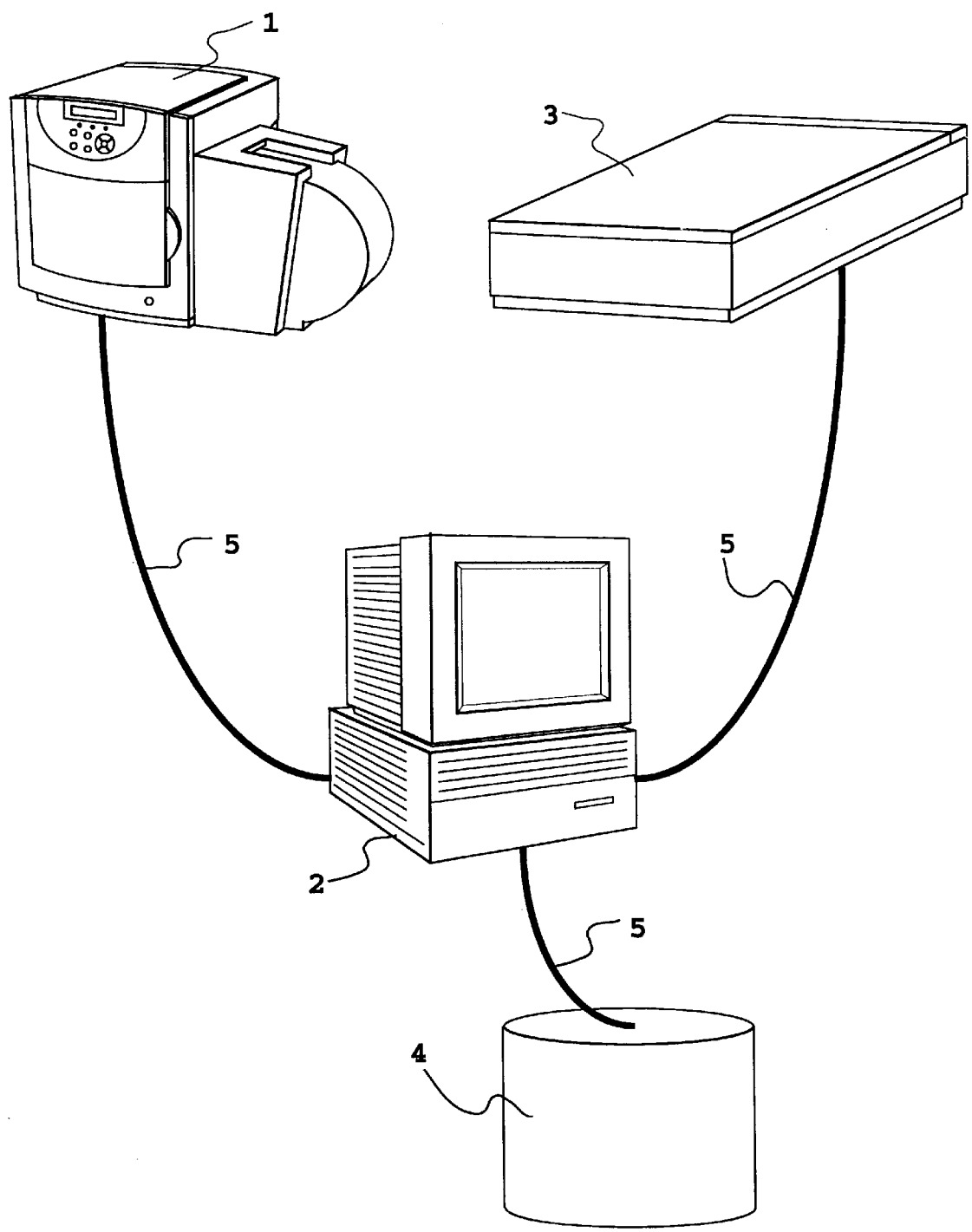
FIG. 1 is a general perspective view of a printing system, to which the present invention is applicable.
Figure 7A:
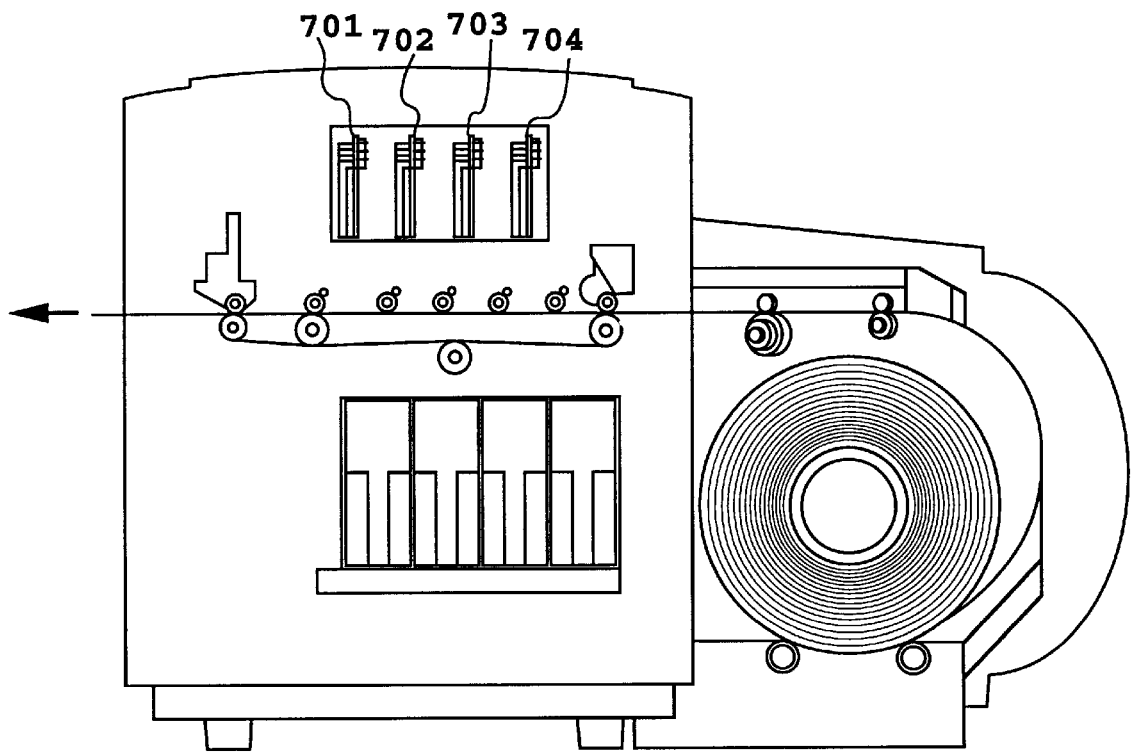
FIG. 7A is a side elevation of a printer, to which the present invention is applicable.
Figure 7B:
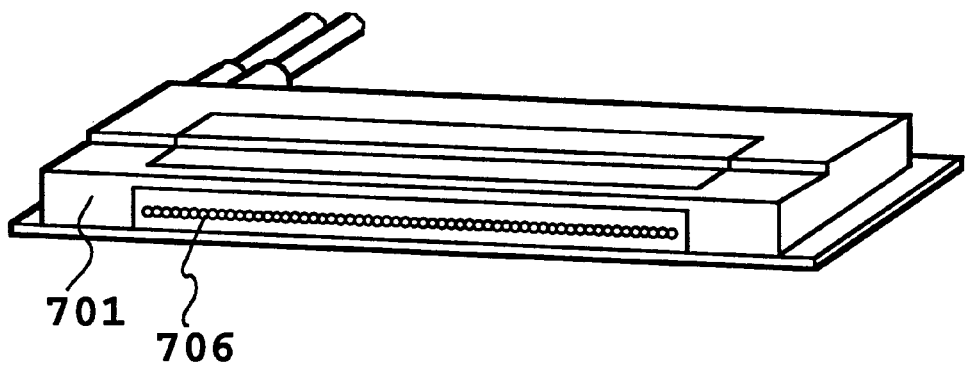
FIG. 7B is an enlarged perspective view of the printing head is shown in FIG. 7A.
Figure 8:
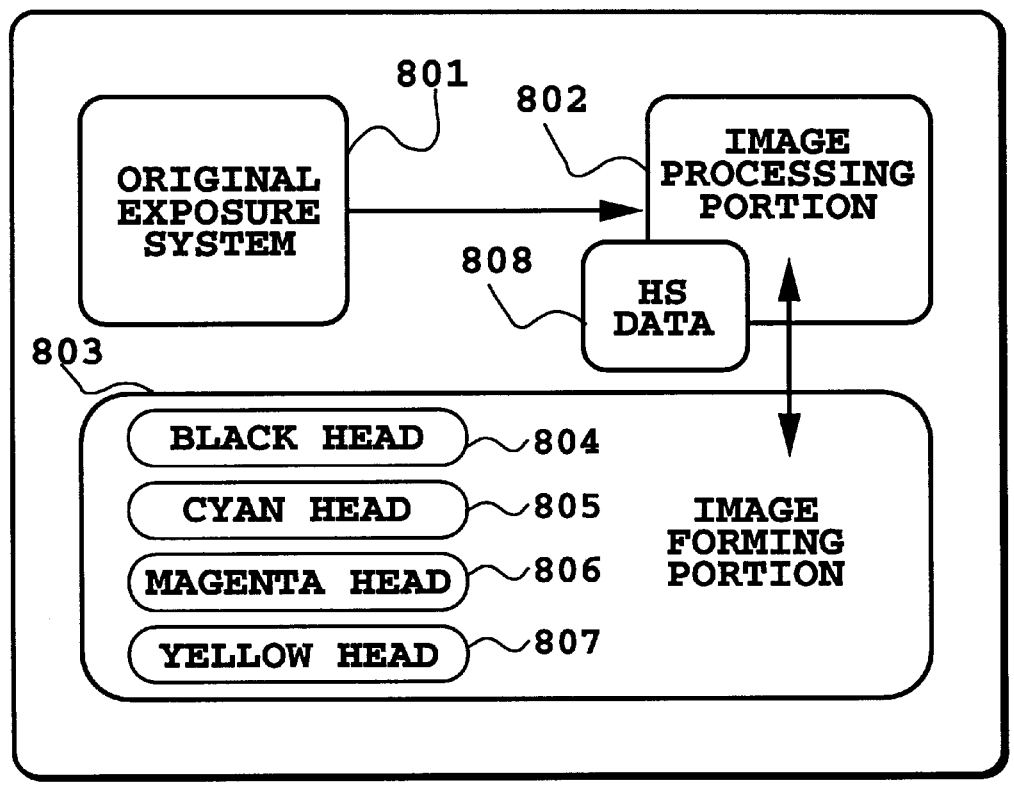
FIG. 8 is an illustration showing general construction for explaining the conventional printing system.

FIG. 1 is a general perspective view of a printing system, to which the present invention is applicable. A color bar code printer 1 as a printer using the system according to the present invention, employs a printing head having an ink passage forming a plurality of nozzles. The construction of the printing head is shown in FIGS. 7A and 7B. As printing heads, a head 704 for ejecting black ink, a head 703 for ejecting cyan ink, a head 702 for ejecting magenta ink and a head 701 for ejecting yellow ink are provided. FIG. 7B shows a perspective view of the head 701, as representative. In FIG. 7B, the reference numeral 706 denote a plurality of ejection openings for ejecting the ink.

In FIG. 1, the bar code printer 1 as the printer, a computer terminal device 2 which can perform image processing and transmission, an image scanner 3 as a reading device, and a storage device 4 storing foregoing HS data for correcting an output image are connected by connection cables 5.

Figure 3:
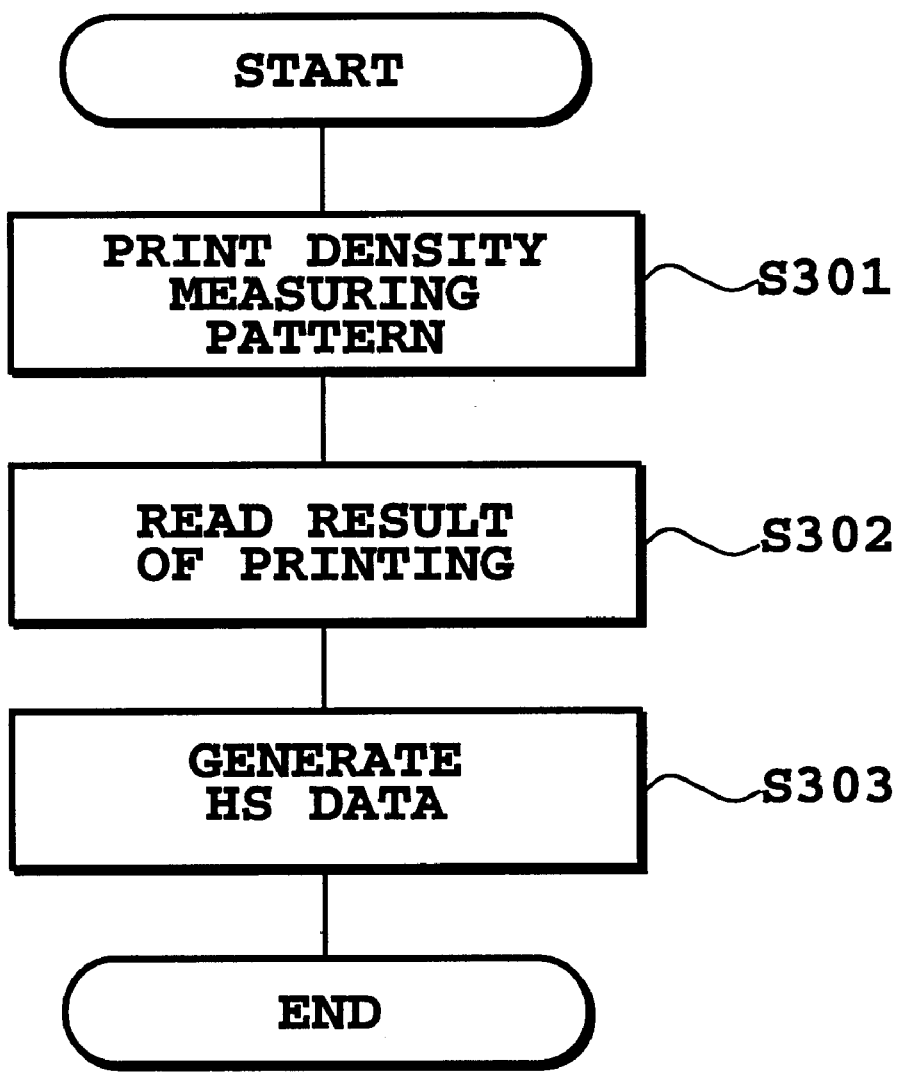
FIG. 3 is a flowchart for explaining operation for generating a HS data in the first embodiment of the present invention.

FIG. 3 is a flowchart for explaining operation from measuring output characteristics of the printing heads of the bar code printer 1 to generation HS data for performing image correction. At first, for detecting density fleck of the printing image, predetermined density measuring pattern is printed by respective printing heads 701 to 704 (step S301).

The density measuring pattern is a printing pattern, in which each printing heads 701 to 704 forms images of predetermined densities per unit area. In this embodiment, a pattern, in which density of printing images by respective printing heads 701 to 704 are 50%, was used. Subsequently, the result of printing of the density measuring pattern is read by the reading device 3 connected to the computer terminal device 2 (step S302) for detecting density fleck of the image printed by respective printing heads 701 to 704. Then, the HS data is generated on the basis of the detecting data of density block (step S303).

Figure 2A:
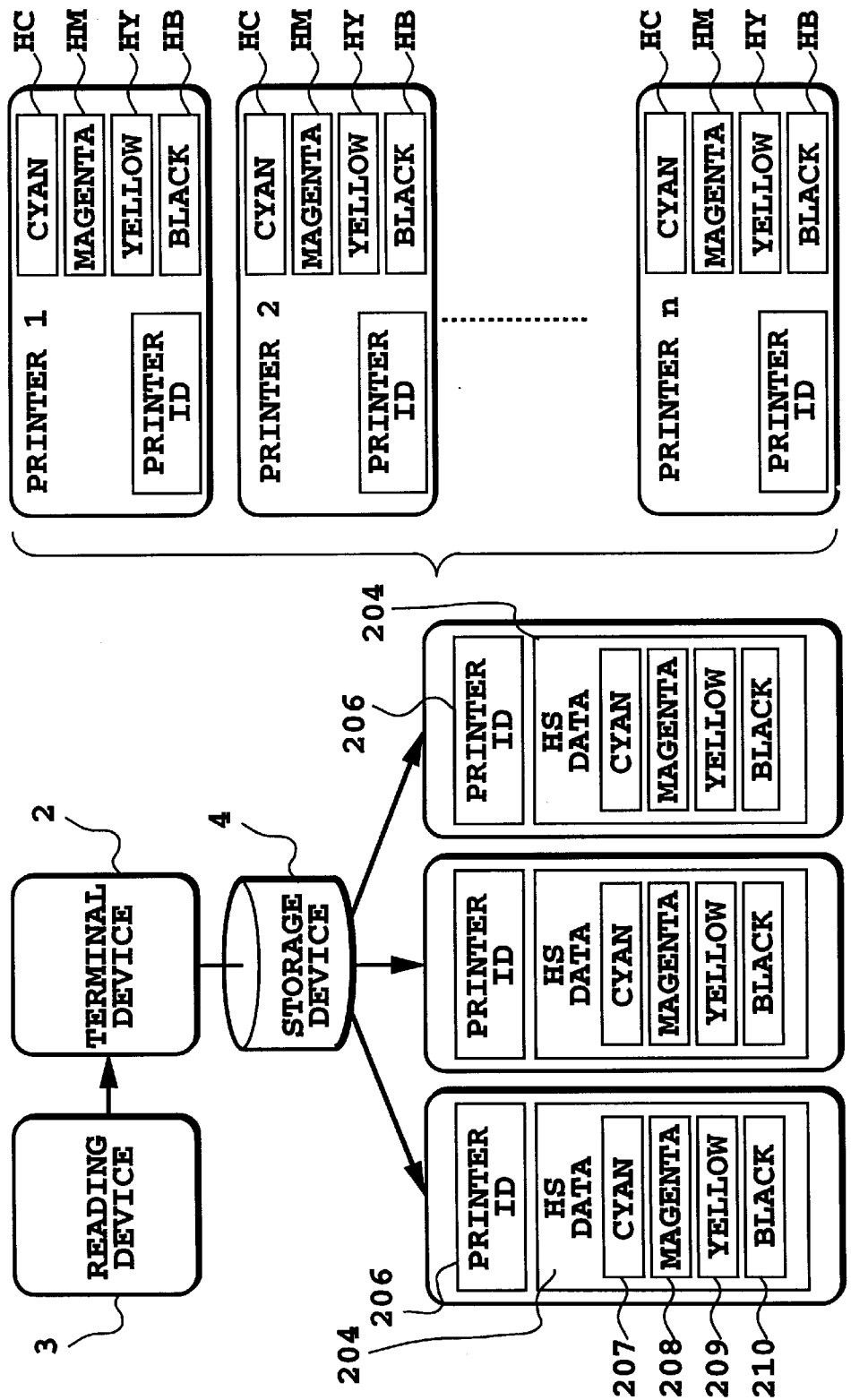
FIG. 2A is an illustration showing a general construction of the first embodiment of the present invention.
Figure 2B:
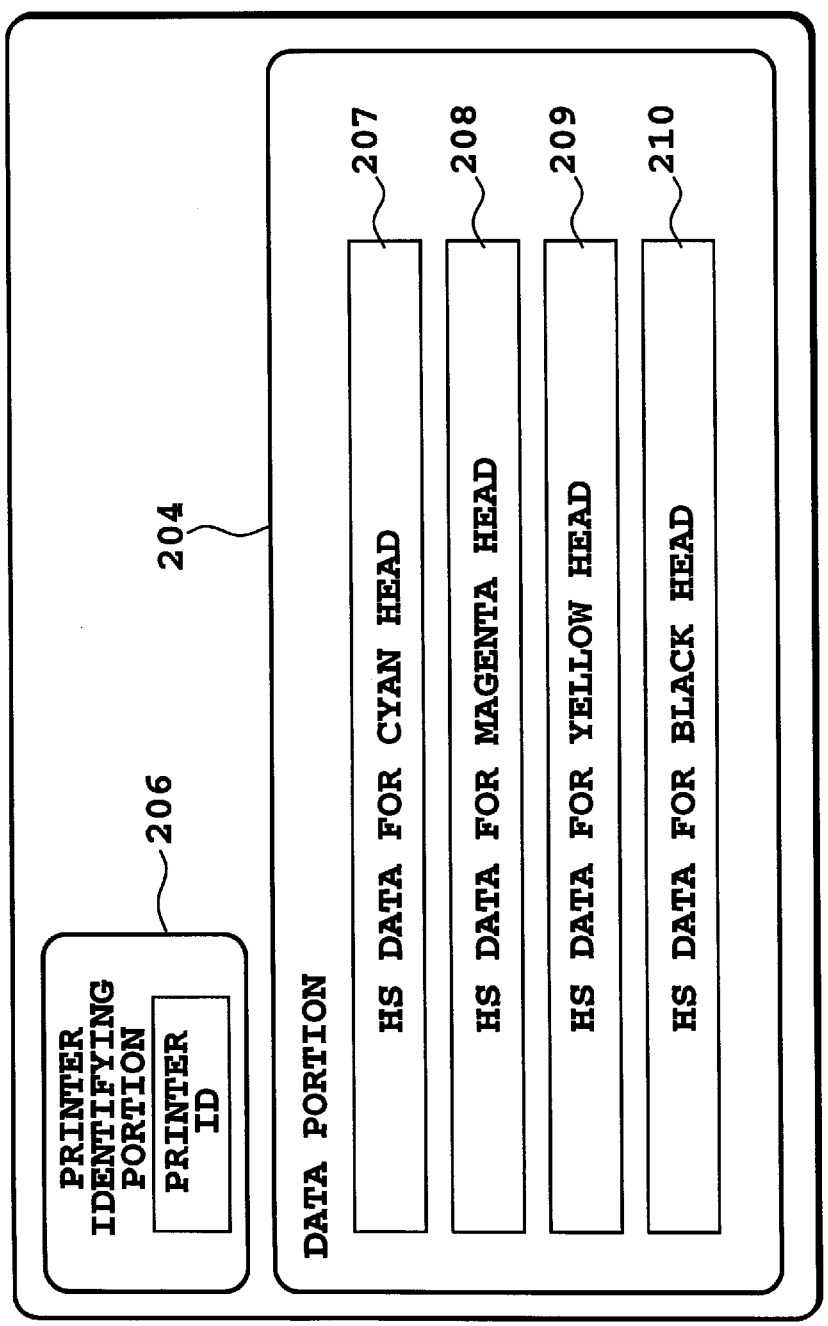
FIG. 2B is an explanatory illustration of a HS table shown in FIG. 2A.

FIGS. 2A and 2B are explanatory illustrations showing a relationship between the printer and the storage content of the storage device 4. Here, as the printer 1, various types of printers other than the bar code printer can be connected. In FIG. 2A, those printers are identified as printers 1, 2, ..., n, and the printing heads for respective of cyan, magenta, yellow and black inks in each printer are identified as HC, HM, HY, HB.

In the storage device 4, a HS data portion 204 and a printer identifying portion 206 are provided. The HS data portion 204 stores HS data 207, 208, 209 and 210 for the printing heads HC, HM, HY and HB of per each printers 1, 2, ... n, connected to the computer terminal device 2. The printer identifying portion 206 stores information consisted of symbol, figure or so forth for identifying the printers 1, 2, ..., n connected to the computer terminal device 2. In the printer identifying portion 206, printer IDs corresponding to printer IDs registered in respective printers 1, 2, ..., n are stored. By checking these printer IDs, the printers 1, 2, ..., n connected to the computer terminal device 2 is identified. By storage data in the data portion 204 and the printer identifying portion 206, the HS table is formed. On the other hand, FIG. 2B show one of the printer identifying portions 206 and the data portions 204 as representative.

As set forth above, each of the printing heads HC, HM, HY and HB is provided with ink passages forming a plurality of nozzles. Therefore, it becomes necessary to know degree of printing density corresponding to each nozzle. For this purpose, read data obtained from the reading device 3, namely, the read data as a result of printing of the density measuring pattern, performs analysis. With respect to the density of the predetermined density measuring pattern to be printed at the predetermined density, variation of the actual printing density is detected.

Figure 4:
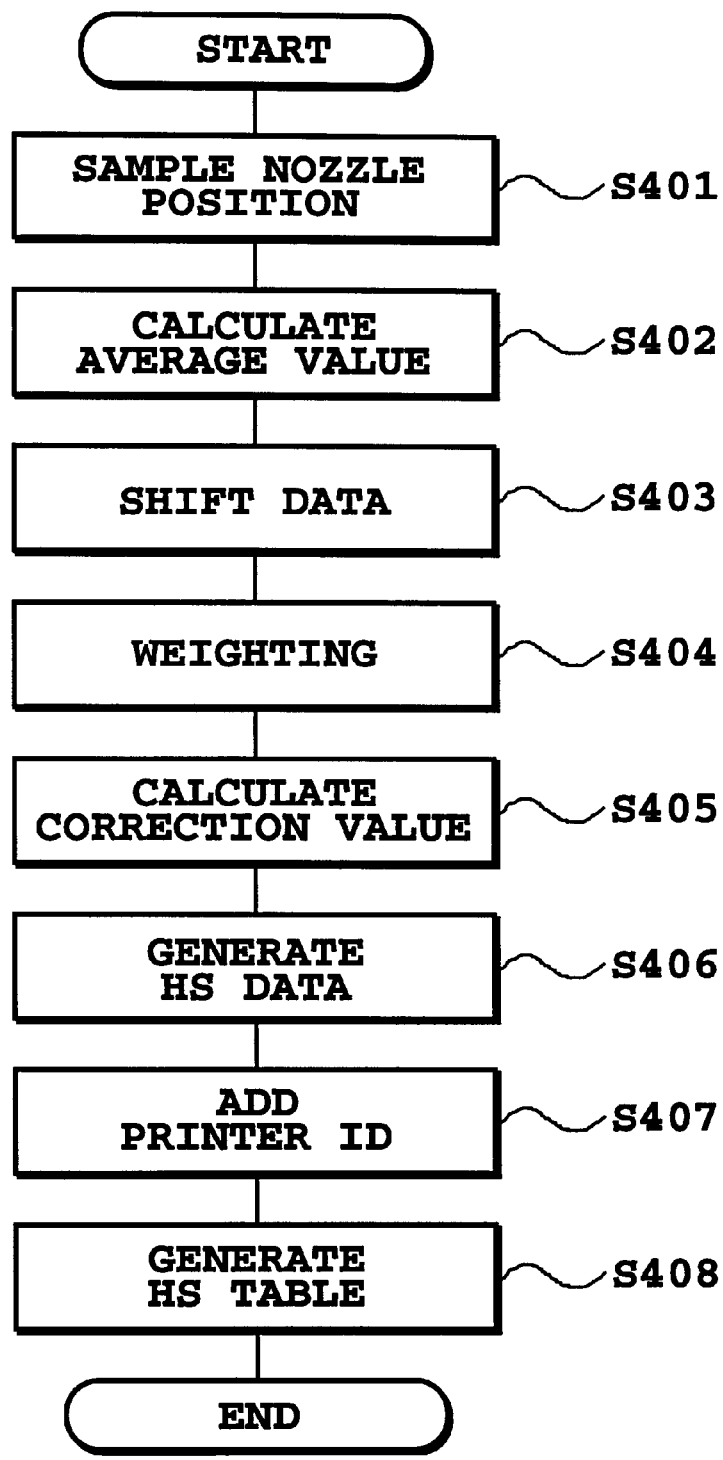
FIG. 4 is a flowchart for explaining a generating operation of a HS table in the first embodiment of the present invention.

Next, using flow chart of FIG. 4, generating operation of the HS data and HS table will be discussed.

At first, in order to establish correspondence between read data obtained from the reading device 3, namely the read density data as a result of printing of the density measuring pattern, and the nozzle of respective head, it becomes necessary to make the resolution of the read density data comparable with the resolution of the printer. Therefore, the resolution of the read density data is converted into the resolution of the printer. Here, the read density data for one line of the reading device 3 are corresponded to respective nozzles of each printing head.

In order to establish correspondence between the printing density corresponding to the nozzle of each printing head and the read density data of the reading device 3, sampling process of the nozzle positions (step S401) is performed. Here, the reading density data obtained from the reading device 3 becomes moderate at rising and falling edges of variation at the boundary between printing region and non-printing region. Therefore, it is difficult to assign the interval from the first nozzle to the final nozzle to the read density data. Thus, paying attention for the portion of rising and falling of data variation, the first nozzle is statistically detected from the read density data, and then with reference to this, other nozzles are corresponded in the sequential order.

Next, per each printing head, an average value of the read density data corresponding to each nozzle is derived (step S402). Then it is used in the later stage for calculation of the correction value. A data shifting process in the next step (step S403) is a process corresponding to variation of the read density data from the reading device 3 depending upon kinds of inks ejected from respective printing head. If where is a large difference is between the average values of the read density data in each printing head, effect of correction which will be described later, should vary significantly per printing head. Thus, the average value of the read density data of each printing head is modified into the same value. For this purpose, the average value per each printing head is further averaged to derive an average value of the read density data common to respective head.

Then, a weighting process (step S404) is the process for improving reliability of the value of the data, for which the sampling process is performed (step S401), namely for the read density data corresponded to each nozzle. Namely, by performing weighting for the peripheral data before and after the data in question, accurate process of the data value corresponding to each nozzle is enabled. Thus obtained read density data per each nozzle is compared with the average value of the read density data per printing head derived in preceding process to calculate a difference therebetween. Then, on the basis of the result of calculation, the HS data per each head is generated (step S406).

Also, the printer ID is added to the HS data so as to identify the corresponding printer (step S407) to establish a HS table (step S408). This HS table is stored in the storage device 4 connected to the computer terminal device 2. With making reference to or retrieving the HS table, head shading is performed.

Figure 5:
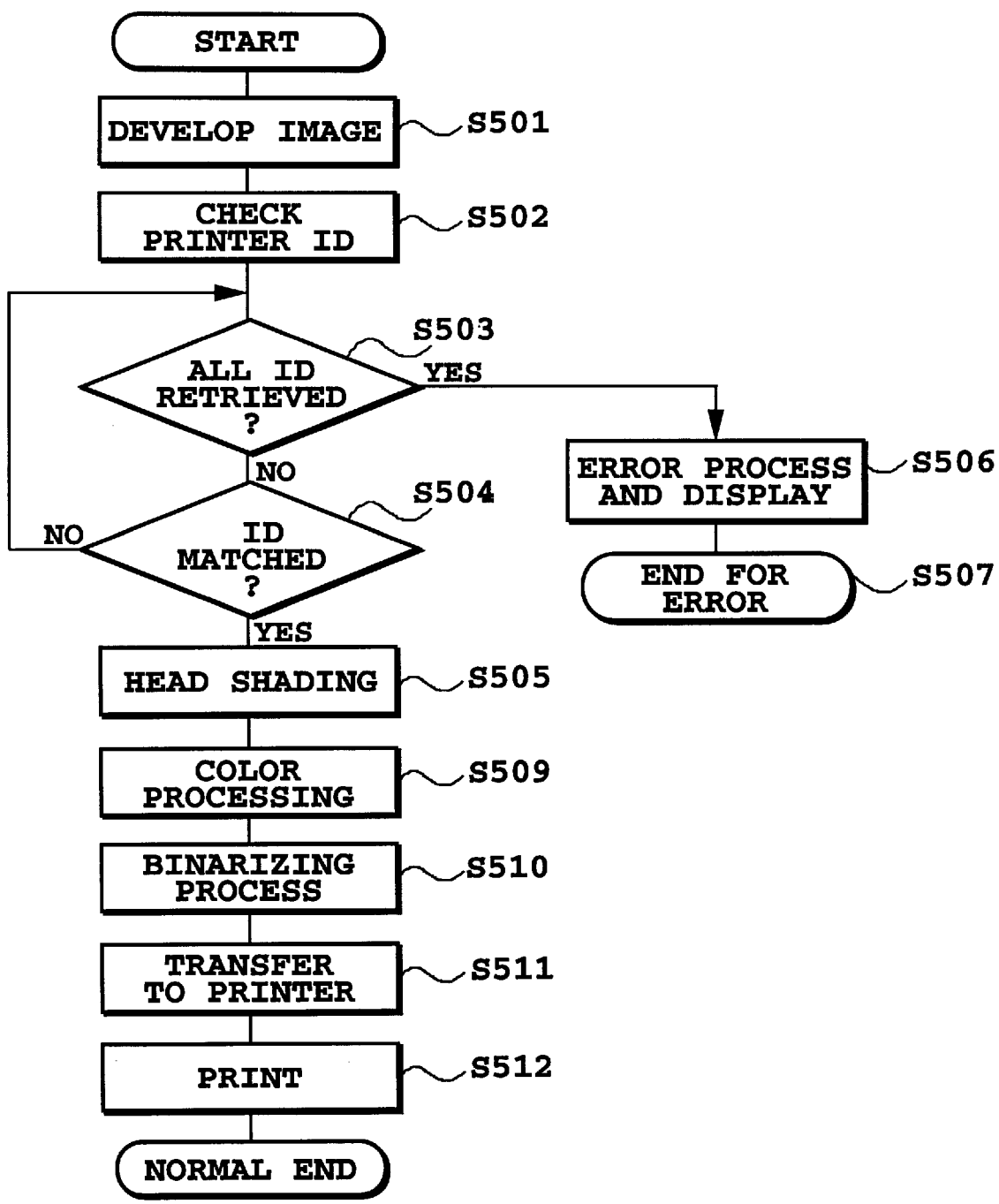
FIG. 5 is a flowchart for explaining a printing operation in the first embodiment of the present invention.

One example of operation of head shaping process employing the HS table will be explained with reference to FIG. 5.

At first, the image data for which an output demand is issued from the computer terminal device 2 is converted into the image data in a form adapted for execution of the head shading (step S501). Then, the printer ID of the printer currently connected to the computer terminal device 2 is checked (step S502). Then, the printer ID is retrieved from all of HS tables registered in the storage device 4 (step S503). Then, if the printer ID is retrieved, it represents that the information of HS data and so on relating to the printer currently connected to the computer terminal device 2 is present. Thus, head shading is implemented using the retrieved HS data (step S505). On the other hand, if the printer ID cannot be retrieved, retrieving process is repeated (steps S503 and S504). If the printer ID cannot be retrieved even after checking all of the HS tables stored in the storage device 4, judgment is made that the information, such as the HS data relating to the currently connected to the computer terminal device 2 is not present. Then, the fact is displayed by way of alarm or the like for error processing (step S506). A series of process is interrupted (step S507).

Upon implementation of the head shading process (step S505), with respect to the image data divided per each printing head, arithmetic process for making the corresponding printing density of the image uniform. Namely, a difference between the average value of the common density data common to respective printing head in the HS data, and the density data of respective nozzle is derived. On the basis of the difference, head shading is performed. In the head shading, when the density data of the nozzle in question is lower than the average value, the printing density of the nozzle in question is increased. On the other hand, when the density data of the nozzle is higher than the average value, the printing density of the nozzle in question is reduced.

After the head shading process (step S505), various color processes of output $\gamma$ correction, masking process, gray processing and so on is performed (step S509). Also, when the currently connected printer is a binary printer, after binarizing process, typically dither method, error diffusion method, is performed (step S510), and then the data is transferred to the printer (step S511) to perform printing (step S512).

Second Embodiment

Figure 6:
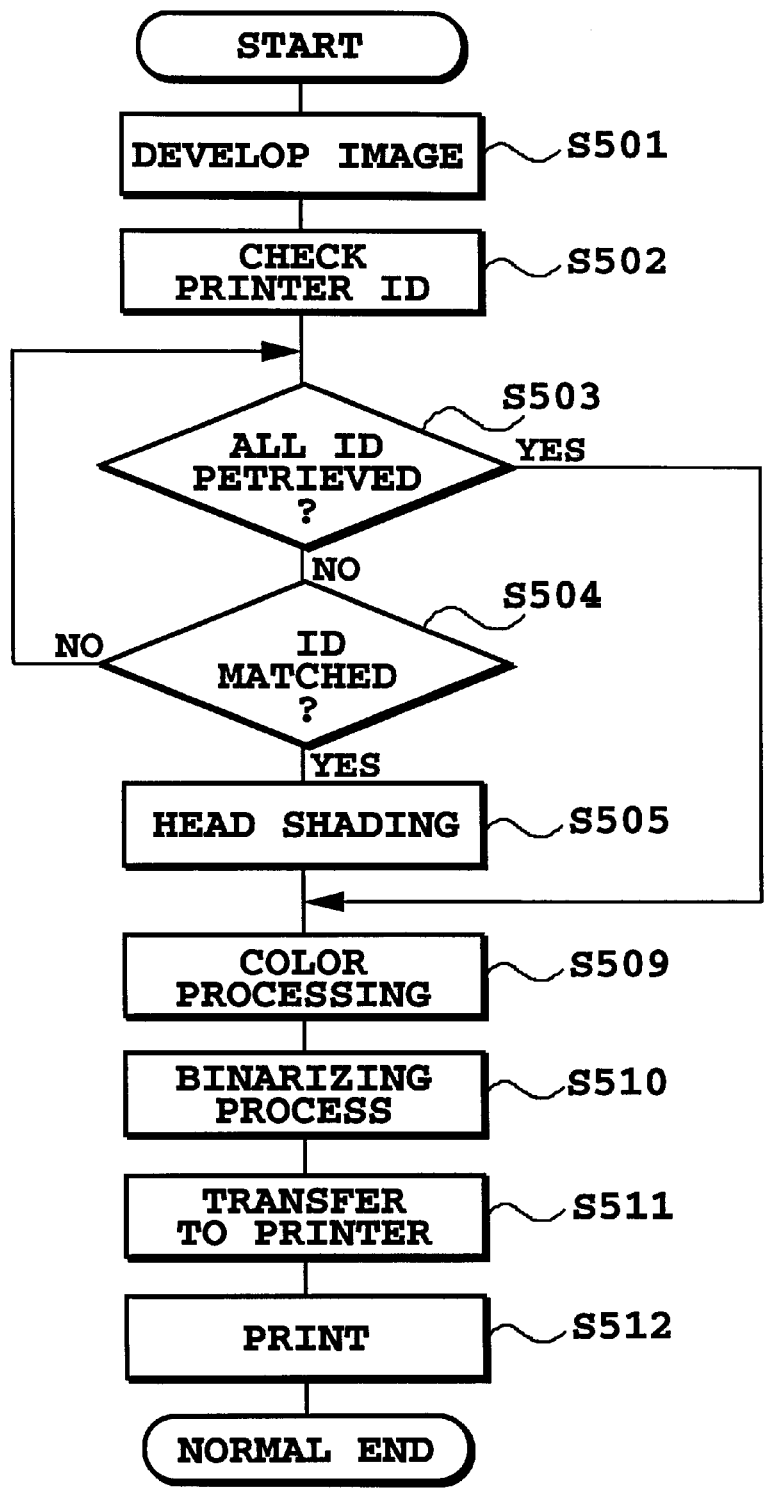
FIG. 6 is a flowchart for explaining a printing operation in the second embodiment of the present invention.

FIG. 6 is flowchart for explaining another embodiment of head shading process employing the HS table similar to the first embodiment as set forth above. In FIG. 6, a point different from the first embodiment illustrated in FIG. 5 is that, when the printer ID is not retrieved at steps S503 and S504, the head shading process is skipped to advance the process to the color processing (step S509).

It should be noted that the printers 1, 2, . . . , n which can be connected as shown in FIG. 2, it is not specified to the color bar code printer, but can be various printer having the printing heads each formed with a plurality of nozzles. On the other hand, the present invention is widely applicable for printing systems having the computer terminal device 2 which can edit the printing data to be transferred to the printer. The printer, the computer terminal device 2 and the reading device are not specified.

On the other hand, a method for determining the HS data, the color process (steps S509, S608) and the other steps, the binarizing process (steps S510, S609) in the process, the conventional processed can be used and thus no further explanation will be given. While the detailed discussion is neglected, concerning these processes, the method and procedure will not be limited.

Third Embodiment

FIGS. 9A, 9B, 10 and 11 are illustration for explaining the third embodiment of the present invention. In the following description, like elements to those in the former embodiment will be identified by the same reference numeral, and the detailed description therefor will be neglected.

Figure 9A:
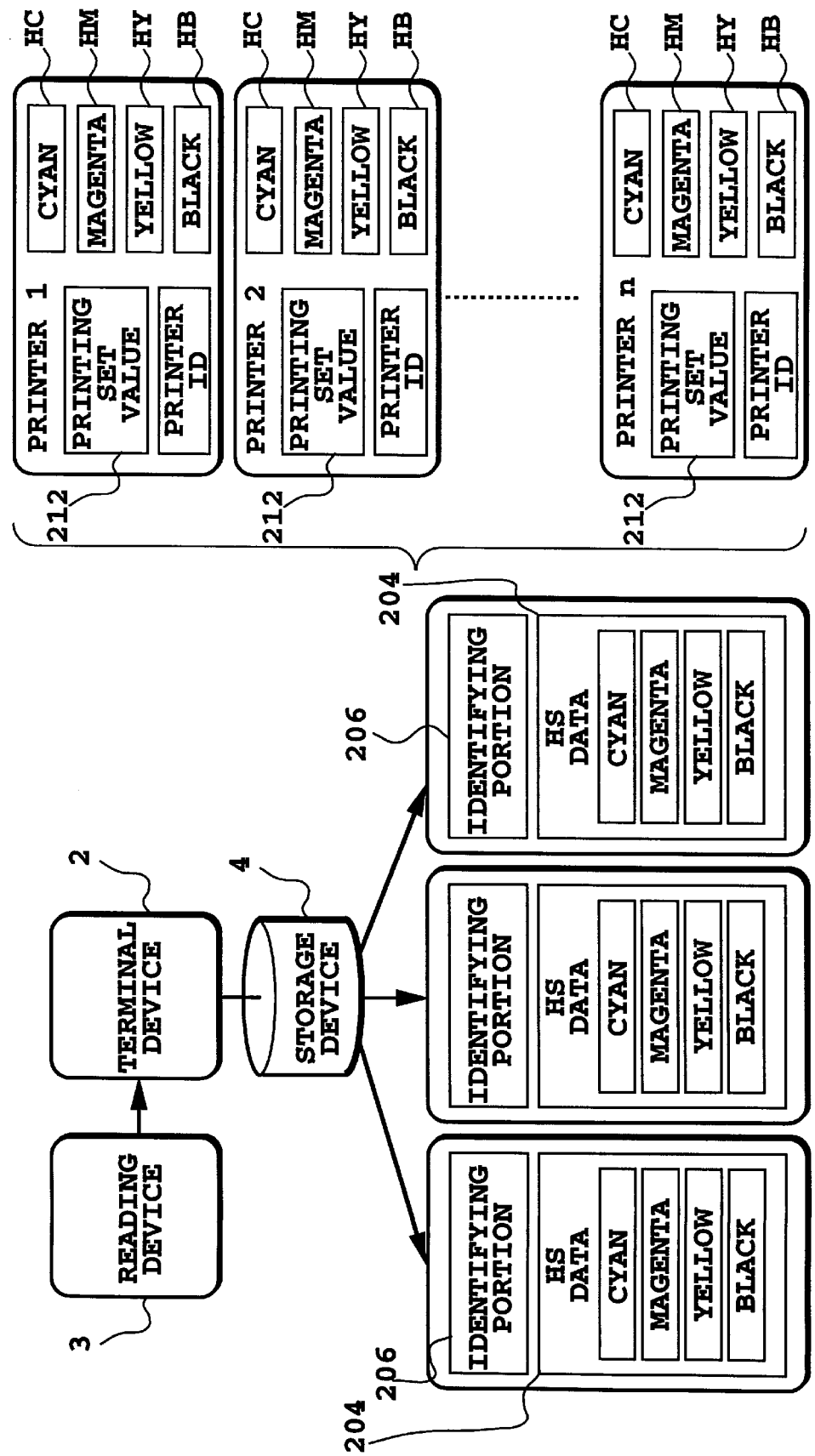
FIG. 9A is an illustration showing a general construction of the third embodiment of the present invention.
Figure 9B:
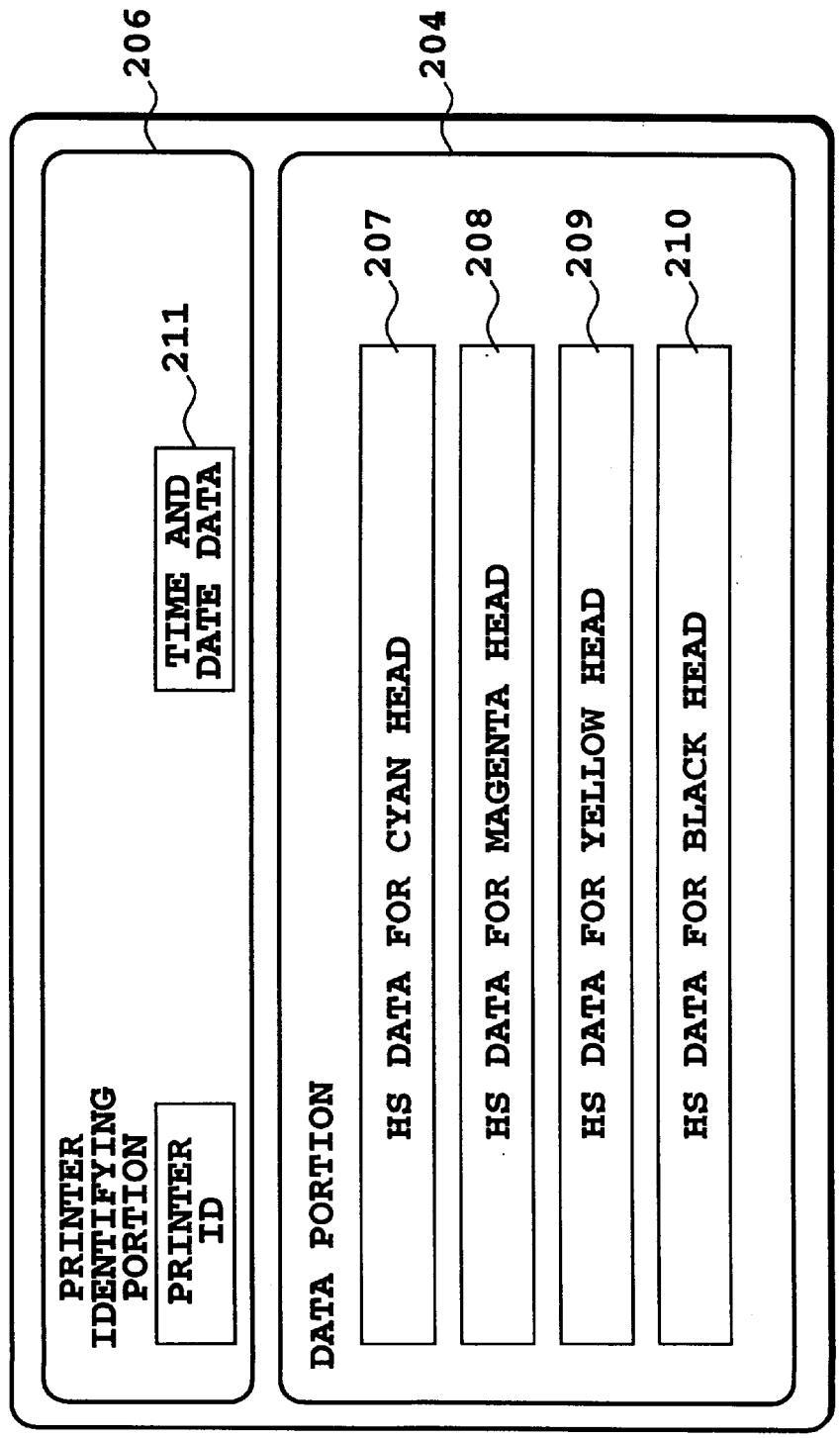
FIG. 9B is an explanatory illustration of the HS table is shown in FIG. 9A.

In case of the shown embodiment, for the printer identifying portion 206 of the storage device 4 shown in FIG. 9B, the date and time, at which the HS data is obtained, they are stored as the time and date data 211. On the other hand, as shown in FIG. 9A, for the printers 1, 2, . . . , n, specific print setting value 212 is set with respect to printing medium. The print setting value 212 may be a printing arrange or a set value of margin of the printing medium. FIG. 9B shows one of the printer identifying portions 206 and the data portions 204 as representative.

Figure 10:
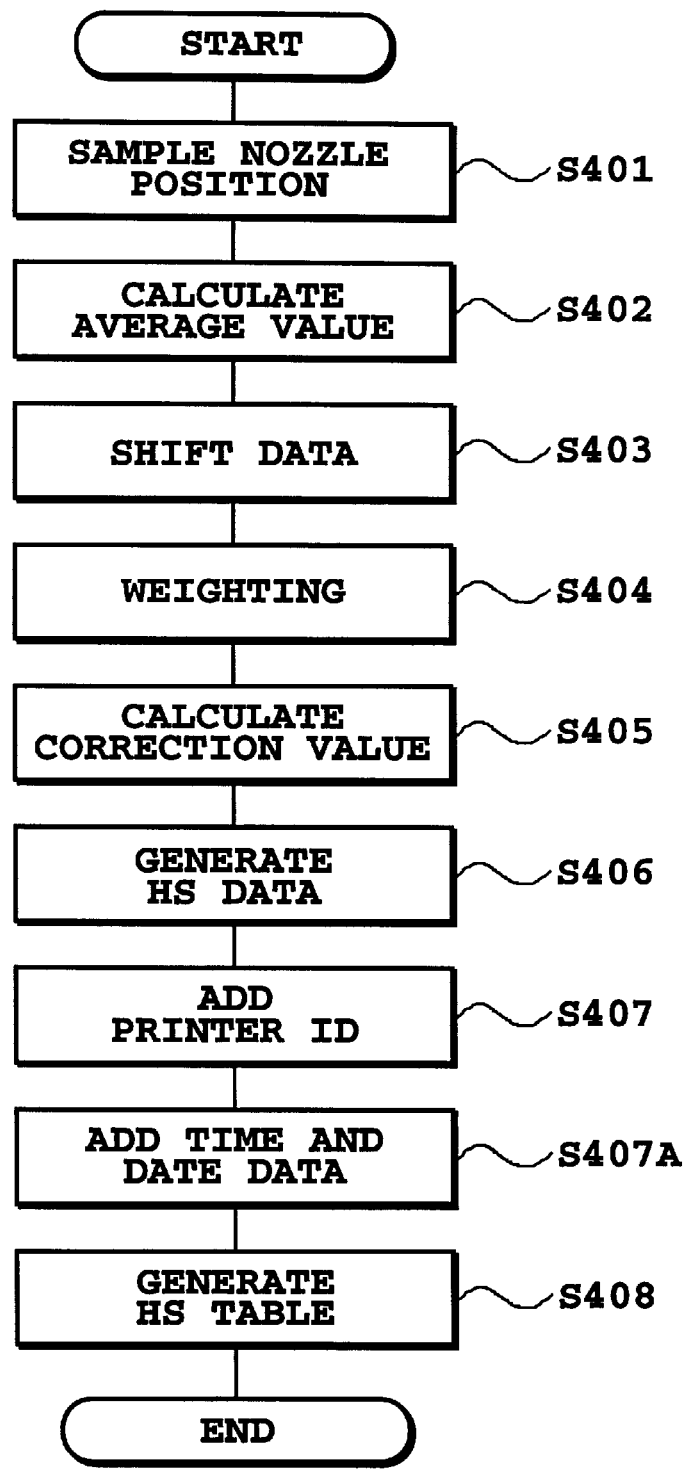
FIG. 10 is a flowchart for explaining operation for generating a HS table in the third embodiment of the present invention.
Figure 11:
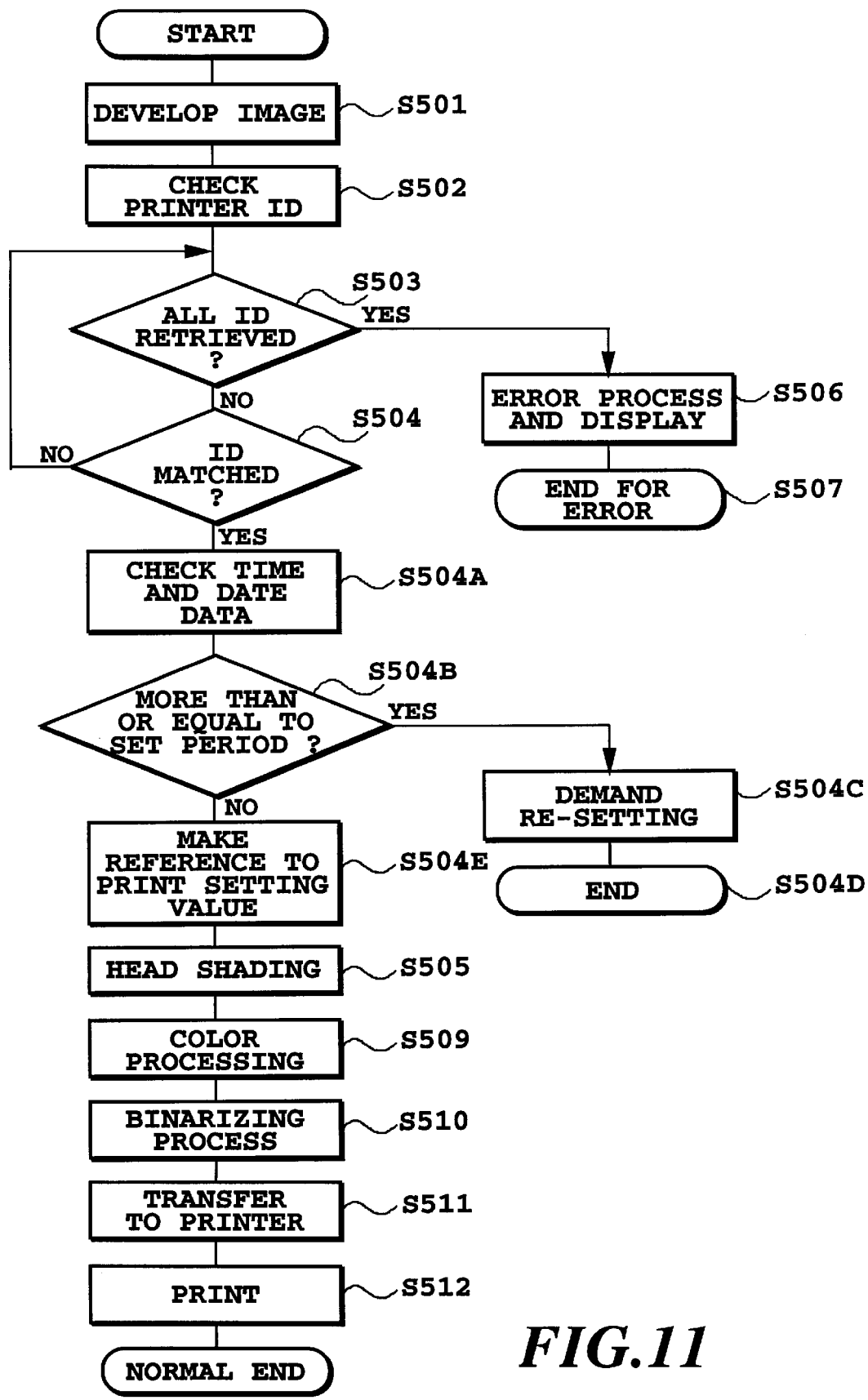
FIG. 11 is a flowchart for explaining a printing operation in the third embodiment of the present invention.

FIG. 10 is a flowchart for explaining HS data and HS table generating operation. In FIG. 10, a point different from the embodiment of FIG. 4 is that, the time and date, at which the HS date is obtained, they are registered in the identifying portion 206 (step S407A) as the time and date data 211. Accordingly, by adding the printing ID and the time and date data 211 to the HS data, the HS table can be established. FIG. 11 is a flowchart of explaining head shading process employing such HS table. In this FIG. 11, the point different from the embodiment of FIG. 5A is that steps S504A, S504B, S504C, S504D and S504E are added. The following is the description for the additional steps.

When the printer ID can be retrieved at step S504, reference is made to the time and date data 211 registered in the printer identifying portion 206 (step S504A). Then, if a period longer than a predetermined elapsed period has been elapsed after obtaining HS data corresponding to the currently retrieved printer ID, re-setting of the HS data is demanded (steps S504B, S504C). Then, process goes end (step S504D). Accordingly, a problem which can be caused when the head shading is performed using the HS data obtained long before, i.e. more than or equal to a predetermined period has been elapsed from obtaining the HS data in question, can be avoided. Namely, when the position of the density fleck is differentiated due to secular change of the printing head, correction using the old HS data should affect adversely.

If the predetermined period is not yet elapsed from obtaining the HS data, with reference to the printer setting value 212 registered in the currently connected printer (step S504E), head shading is performed (step S505). When the head shading is performed, certain type of printing heads requires to consider the printer setting value 212, such as printing range or margin set, for example. In such case, process will be performed with reference to the printer setting value 212.

Here, the print setting value 212 will be described.

When the printer 1 is a so-called full line type printer, it has a printing head H extending in the width direction of the printing medium S. Then, printing is performed for printing the image on the printing medium by ejecting the ink from respective nozzles N of the printing head H with transporting the printing medium S in the longitudinal direction as indicated by arrow. In case of such printer, depending on the set values of the printing ranges L1-A, L2-A for the printing medium S and set values of the margin L1-B, L2-B, the nozzles to be used are differentiated. Therefore, such set values are preliminarily set as the print setting value 212. By using such setting value 212, accurate head shading can be performed with assigning the corresponding HS data for the nozzles to be used.

Fourth Embodiment

Figure 12:
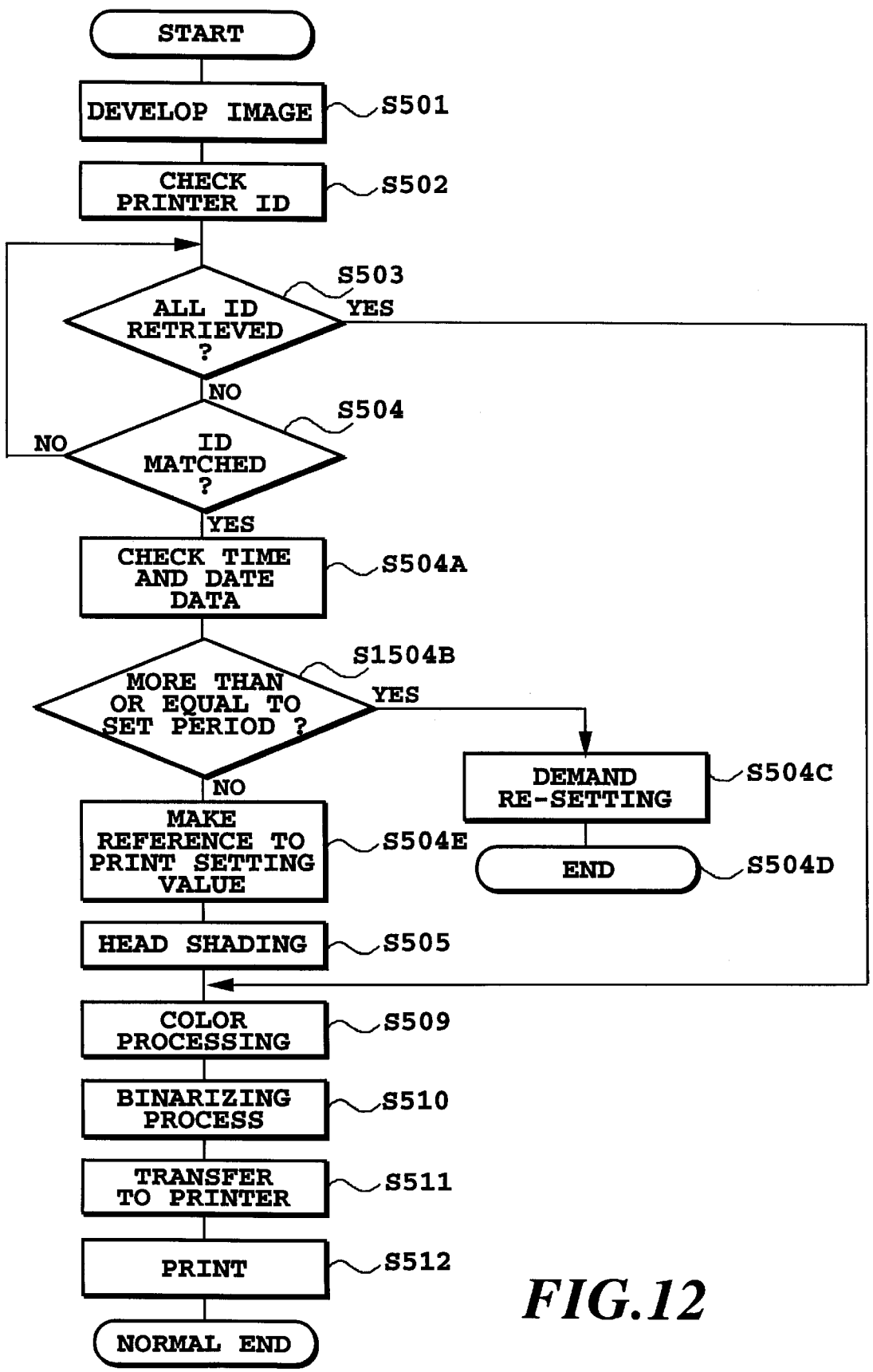
FIG. 12 is a flowchart for explaining a printing operation in the fourth embodiment of the present invention.

FIG. 12 is a flowchart showing another embodiment of the head shading processing operation using the same HS data as that in the third embodiment set forth above. In FIG. 12, the point different from the third embodiment of FIG. 11 is that, when the printer ID is not retrieved at steps S503 and S504, the head shading process is skipped to advance the process to the color processing (step S509).

Fifth Embodiment

Figure 13:
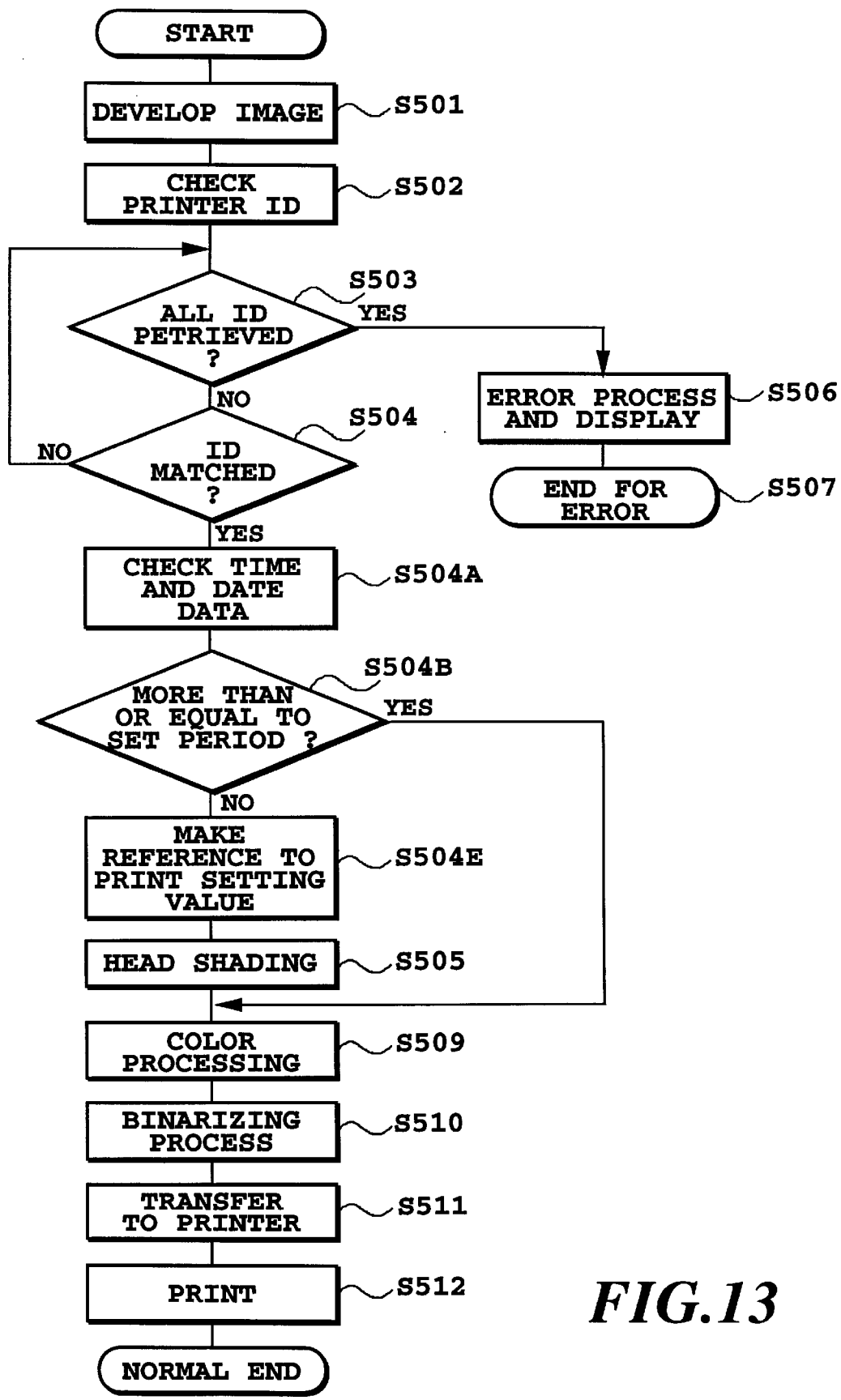
FIG. 13 is a flowchart for explaining a printing operation in the fifth embodiment of the present invention.

FIG. 13 is a flowchart for explaining a further embodiment of the head shading processing operation using the same HS data as that in the third embodiment set forth above. In FIG. 13, a point different from the foregoing third embodiment of FIG. 11 is that, when a period longer than or equal to the predetermined elapsed period has been elapsed after obtaining the HS data, the process is advanced from the step S504B to the color processing (step S509). Accordingly, in this case, the head shading process (step S505) is skipped to avoid problem which can be caused by implementation with the old HS data.

Sixth Embodiment

Figure 14:
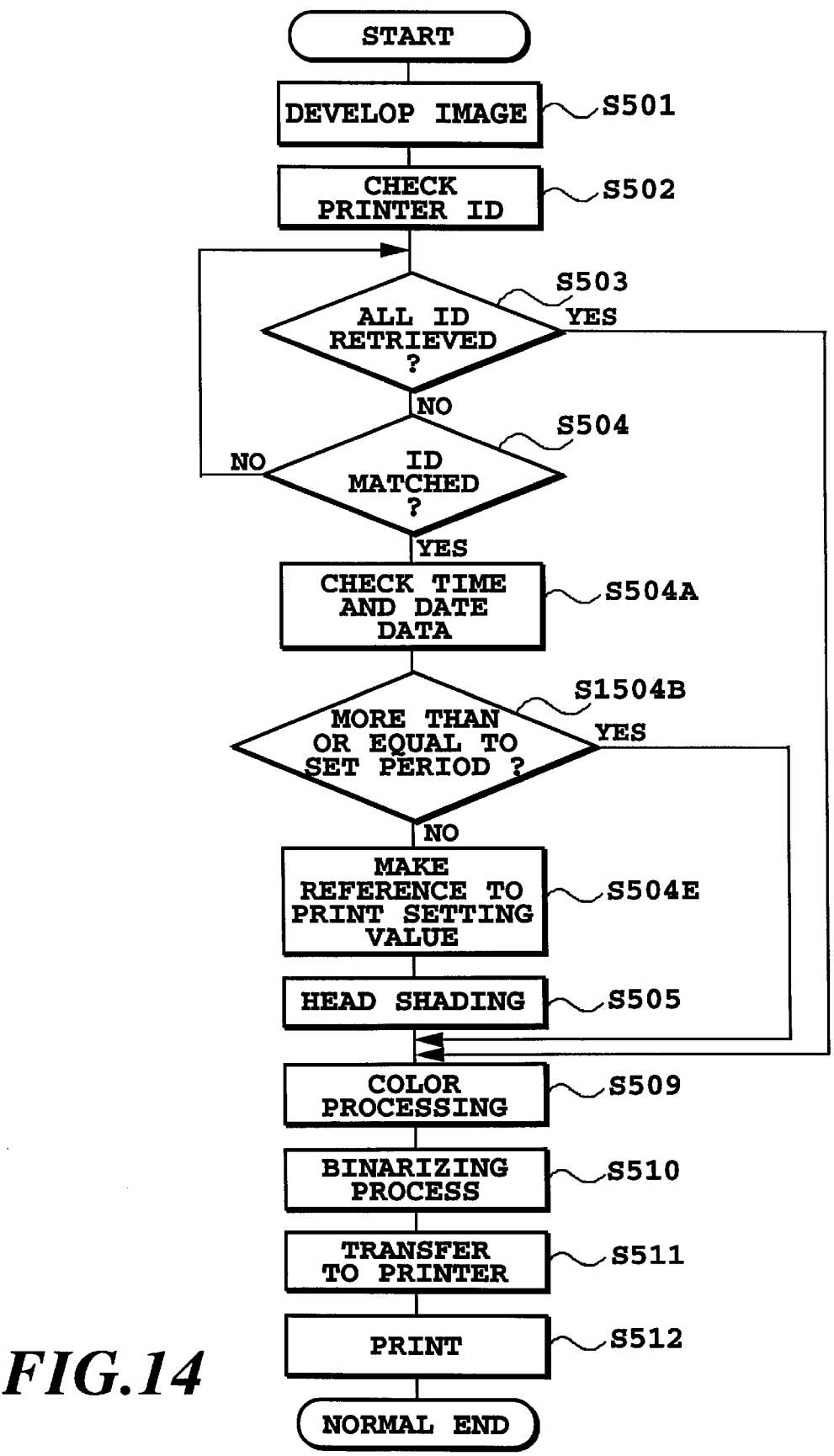
FIG. 14 is a flowchart for explaining a printing operation in the sixth embodiment of the present invention.
Figure 15:
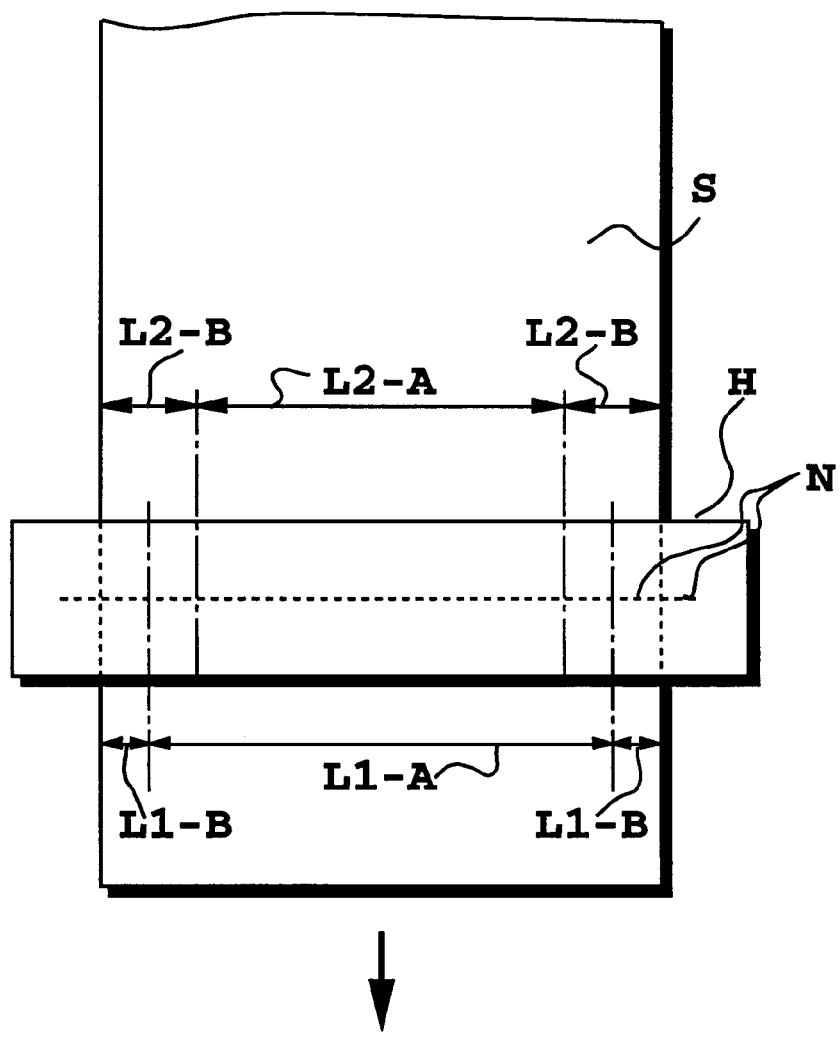
FIG. 15 is an explanatory illustration for a printing set value shown in FIG. 9A.

FIG. 14 is a flowchart for explaining a still further embodiment of the head shading processing operation using the same HS data as that in the third embodiment set forth above. In FIG. 14, a point different from the former fifth embodiment of FIG. 13 is that, when the printer ID is not retrieved at steps S503 and S504, the head shading process is skipped and the process is advanced to the color processing (step S509).

Seventh Embodiment

Figure 16A:
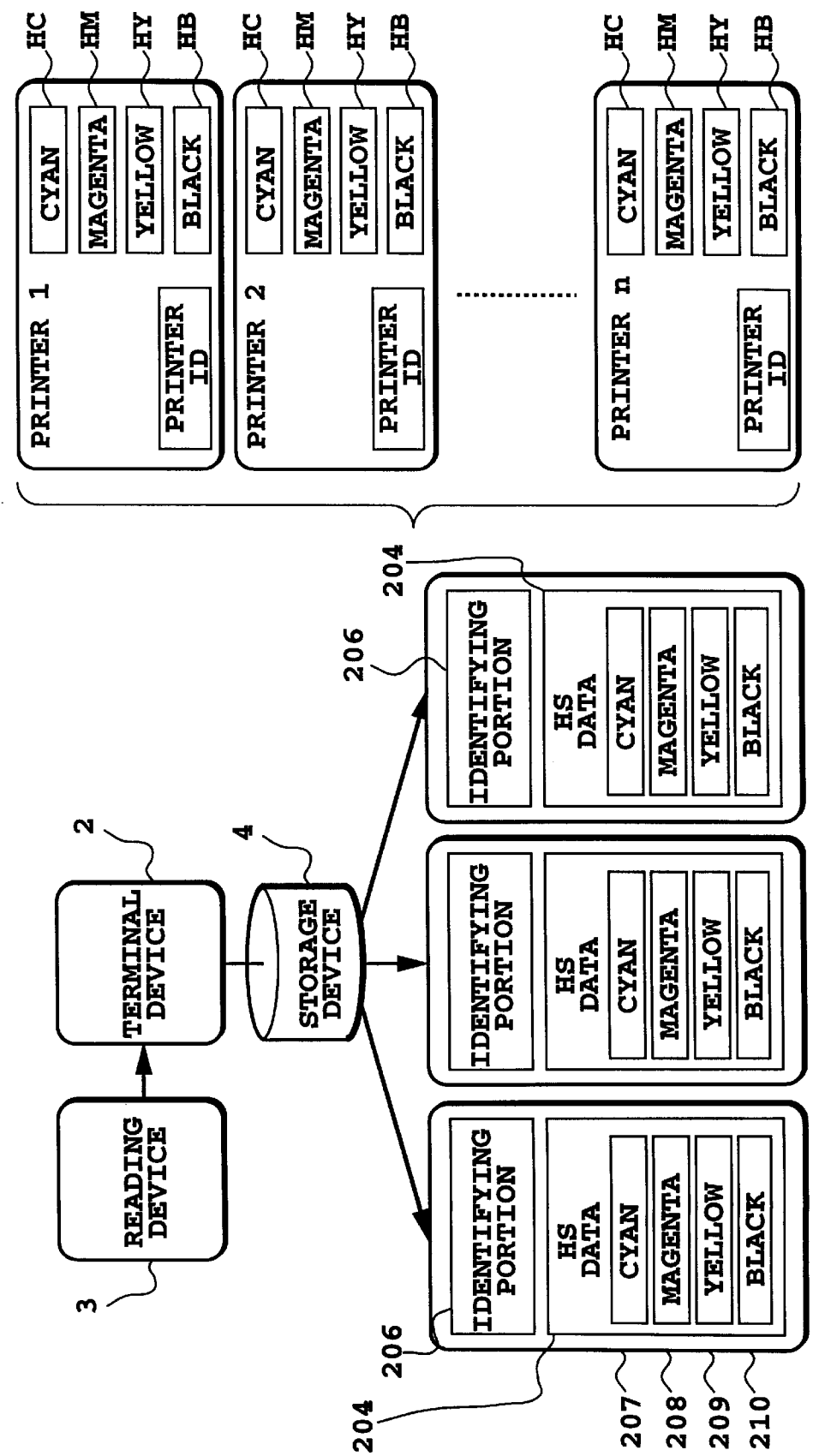
FIG. 16A is an illustration showing a general construction of the seventh embodiment of the present invention.
Figure 16B:
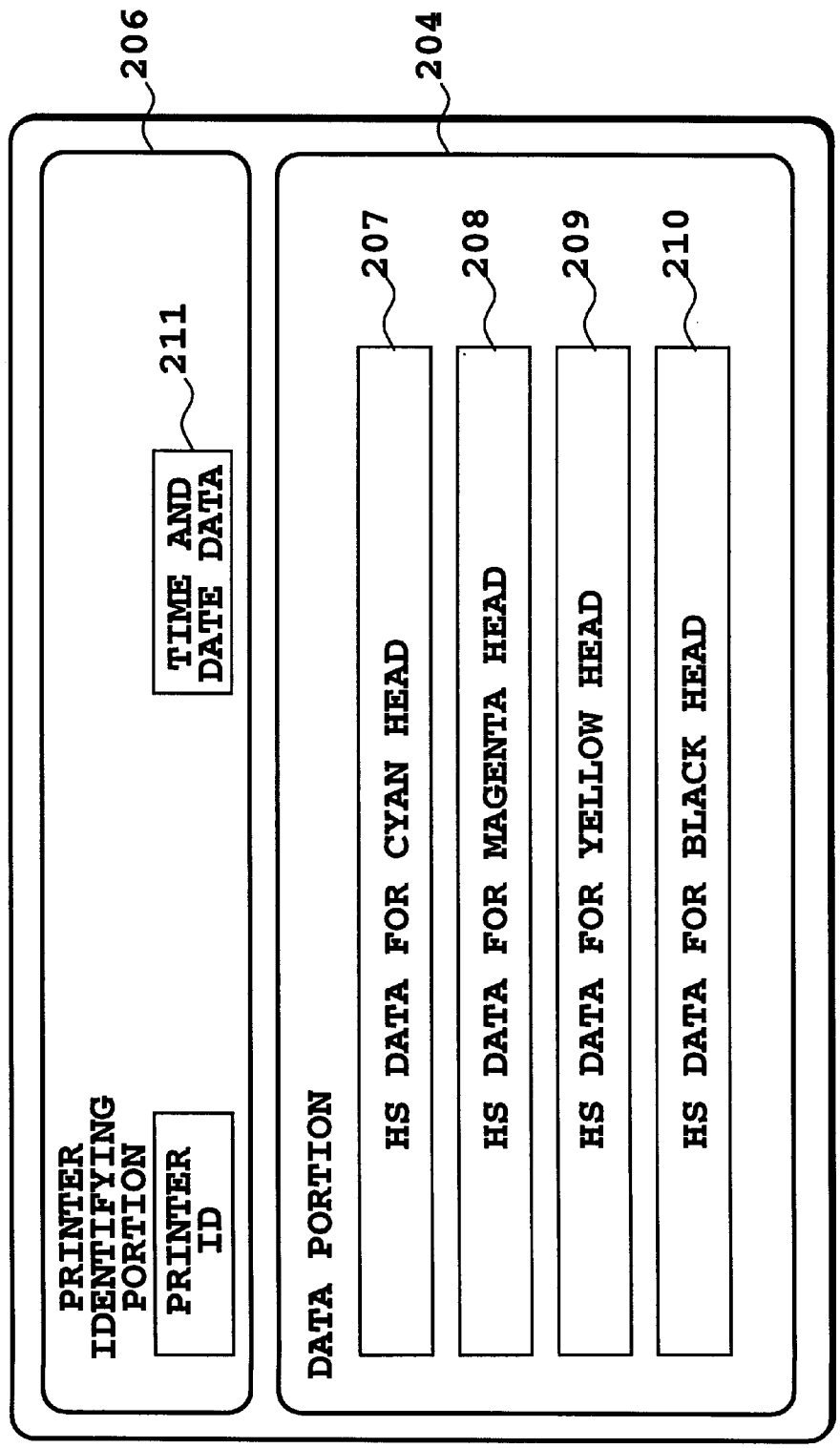
FIG. 16B is an explanatory illustration of the HS table is shown in FIG. 16A.

FIGS. 16A and 16B are explanatory illustration of the seventh embodiment of the present invention. In the following description, like elements to those in the former embodiment will be identified by same reference numeral, and the detailed description therefor will be neglected.

In the shown embodiment, as shown in FIG. 9B, the time and date data 211 is stored in the printer identifying portion 206 of the storage device 4 of the first embodiment shown in FIGS. 2A and 2B. FIG. 9B illustrates one of the printer identifying portions 206 and one of the data portion 204 as representative. The generating operation of the HS data and the HS table are the same as those in the third embodiment as explained with respect to FIG. 10.

Figure 17:
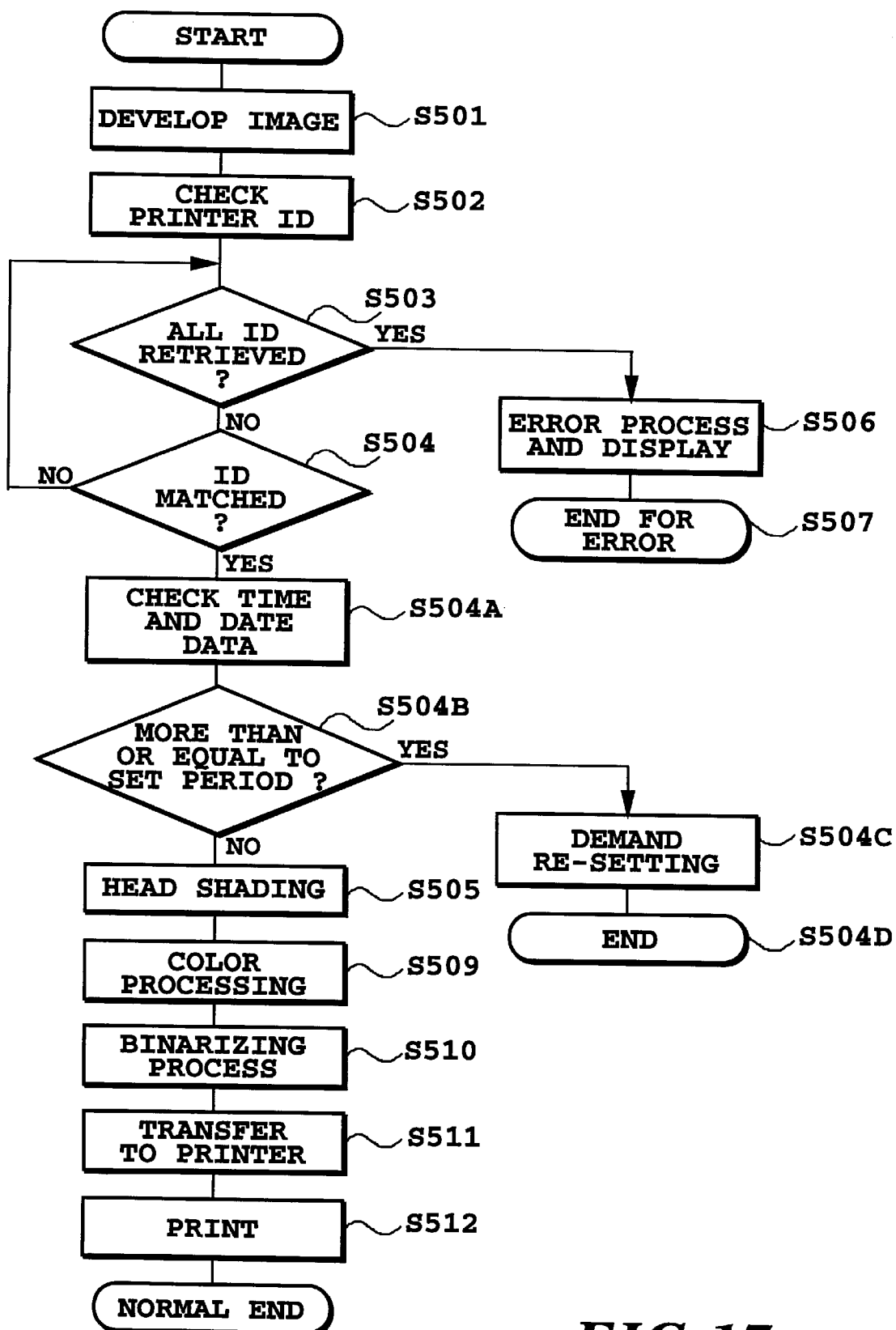
FIG. 17 is a flowchart for explaining a printing operation in the seventh embodiment of the present invention.

FIG. 17 is an explanatory illustration of the head shading processing operation using the HS table. In FIG. 17, the point different from the foregoing first embodiment of FIG. 5 is that, the steps S504A, S504B, S504C and S504D are added. The additional steps will be described hereinafter.

When the printer ID can be retrieved at step S504, reference is made to the time and date data 211 registered in the printer identifying portion 206 (step S504A). Then, if a period longer than a predetermined elapsed period has been elapsed after obtaining HS data corresponding to the currently retrieved printer ID, re-setting of the HS data is demanded (steps S504B, S504C). Then, process goes end (step S504D). Accordingly, a problem which can be caused when the head shading is performed using the HS data obtained long before, i.e. more than or equal to a predetermined period has been elapsed from obtaining the HS data in question, can be avoided. Namely, when the position of the density fleck is differentiated due to secular change of the printing head, correction using the old HS data should affect adversely.

If the predetermined period is not yet elapsed from obtaining the HS data, head shading is performed (step S505).

Eighth Embodiment

Figure 18:
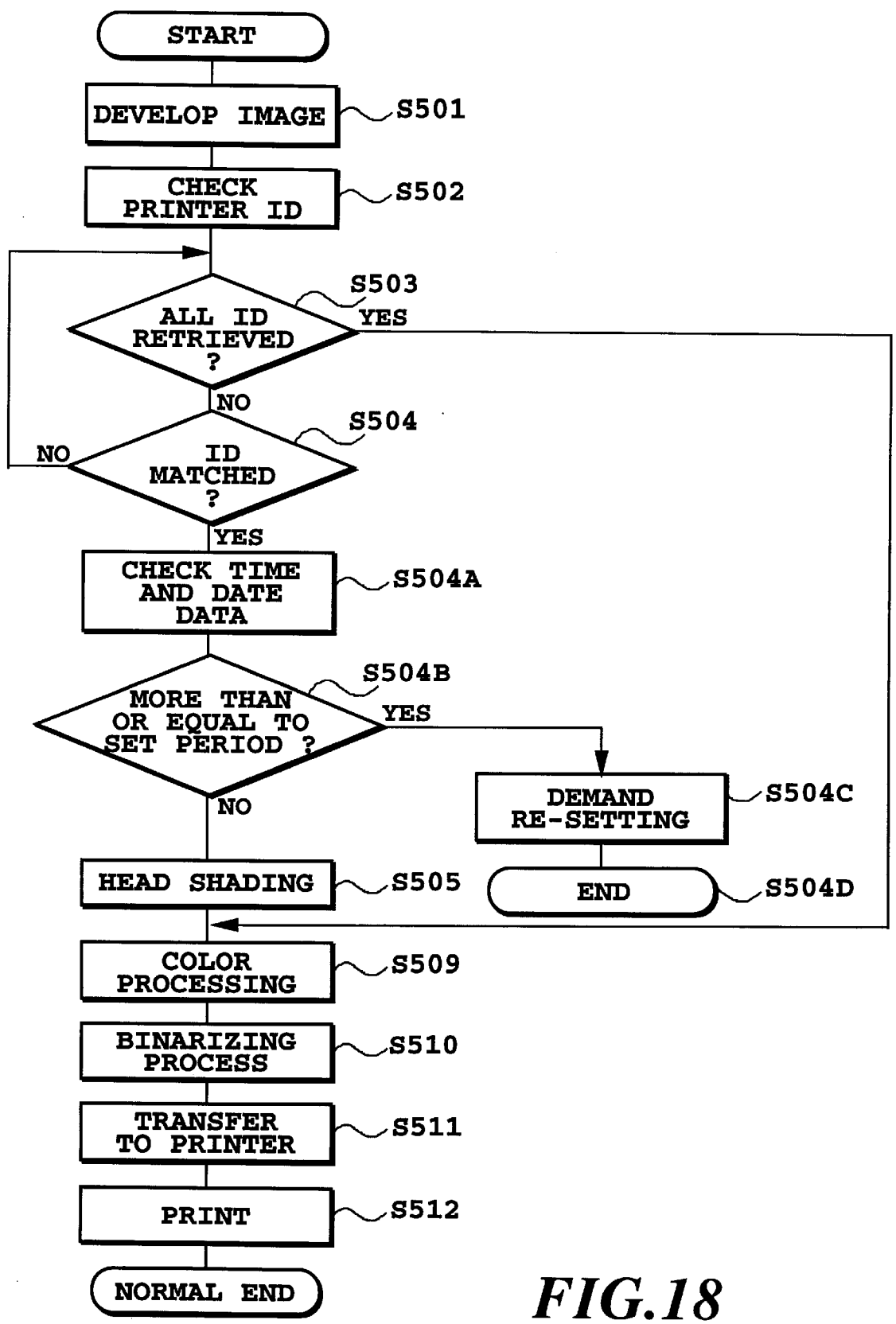
FIG. 18 is a flowchart for explaining a printing operation in the eighth embodiment of the present invention.

FIG. 18 is a flowchart for explaining a yet further embodiment of the head shading processing operation using the same HS table as that in the seventh embodiment set forth above. In FIG. 18, a point different from the seventh embodiment of FIG. 17 is that when the printer ID is not retrieved at steps S503 and S504, the head shading process is skipped and the process is directly advanced to the color processing (step S509).

Ninth Embodiment

Figure 19:
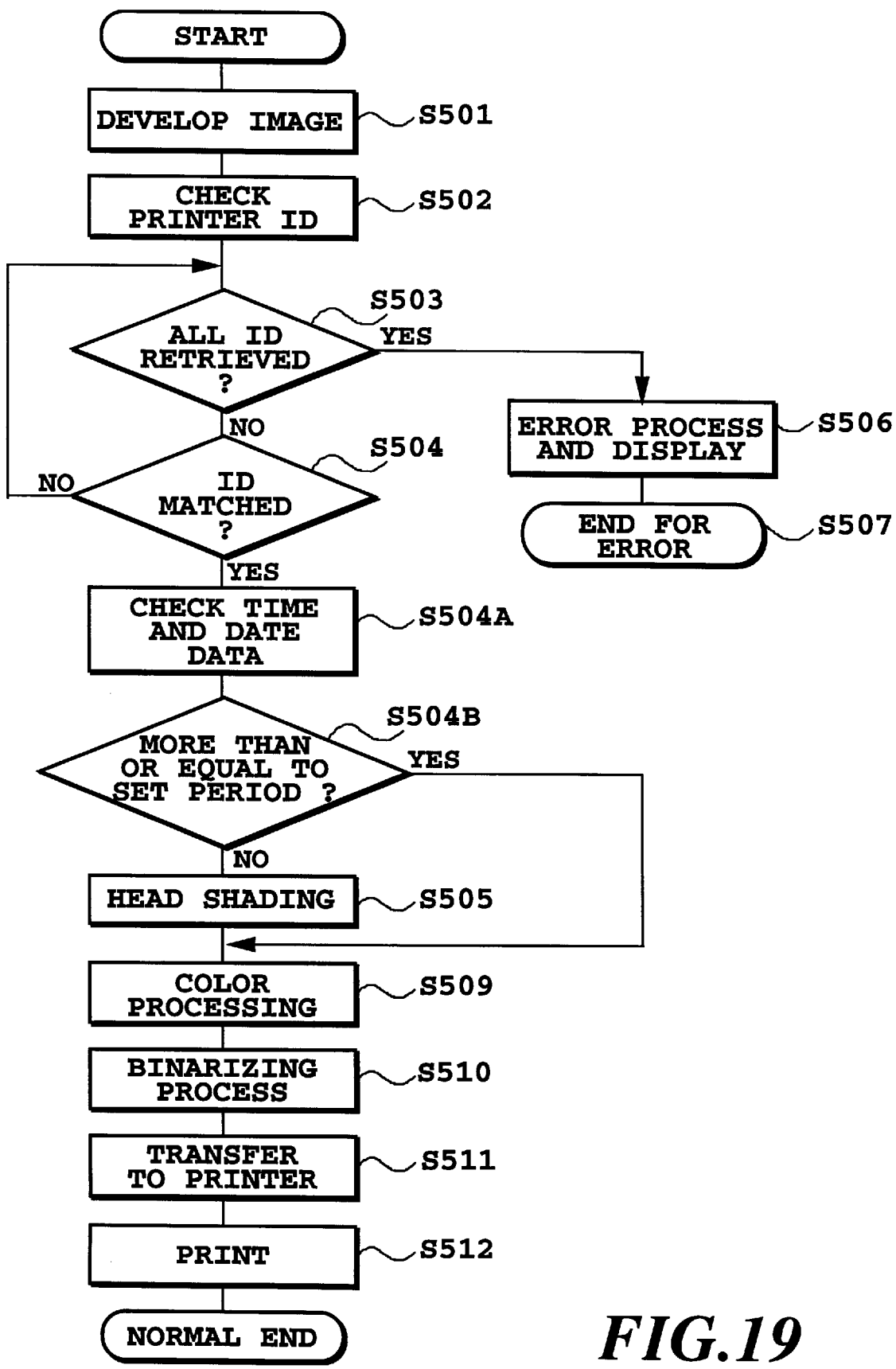
FIG. 19 is a flowchart for explaining a printing operation in the ninth embodiment of the present invention.

FIG. 19 is a flowchart for explaining a still further embodiment of the head shading processing operation using the same HS data as that in the seventh embodiment set forth above. In FIG. 19, a point different from the foregoing seventh embodiment of FIG. 17 is that, when a period longer than or equal to the predetermined elapsed period has been elapsed after obtaining the HS data, the process is advanced from the step S504B to the color processing (step S509). Accordingly, in this case, the head shading process (step S505) is skipped to avoid problem which can be caused by implementation with the old HS data.

Tenth Embodiment

Figure 20:
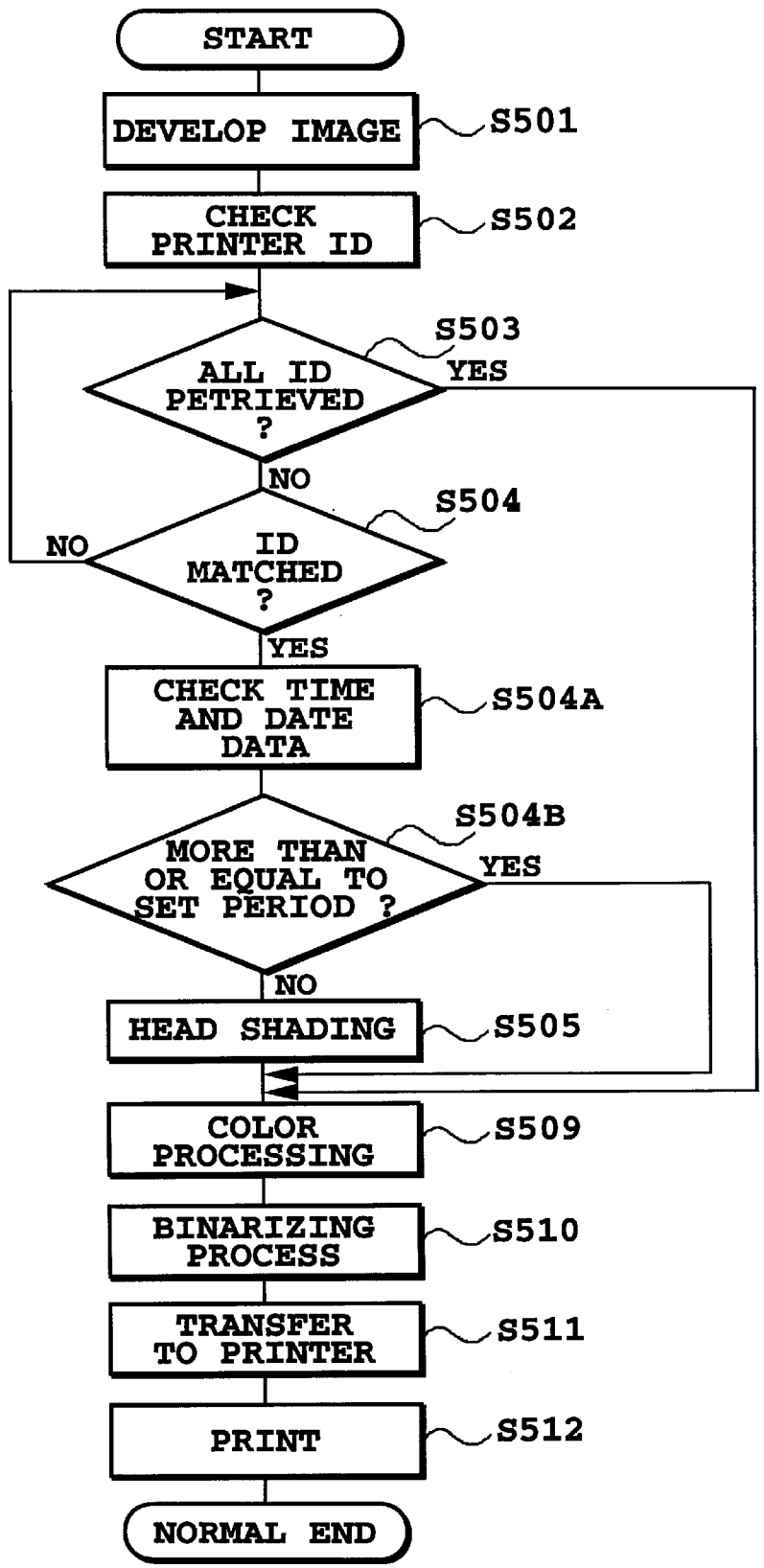
FIG. 20 is a flowchart for explaining a printing operation in the tenth embodiment of the present invention.
Figure 21A:
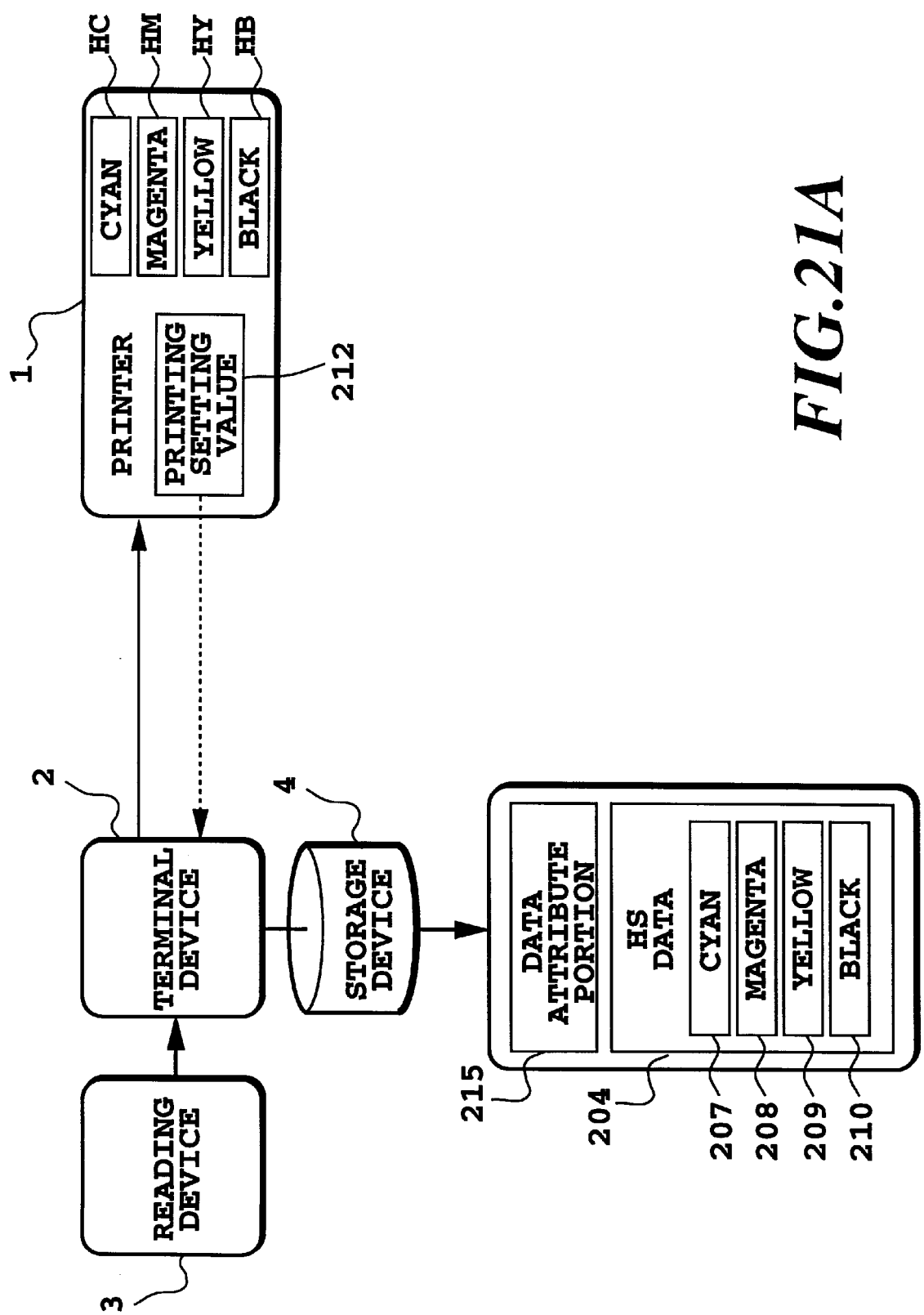
FIG. 21A is an illustration showing general construction of the eleventh embodiment of the present invention.
Figure 21B:
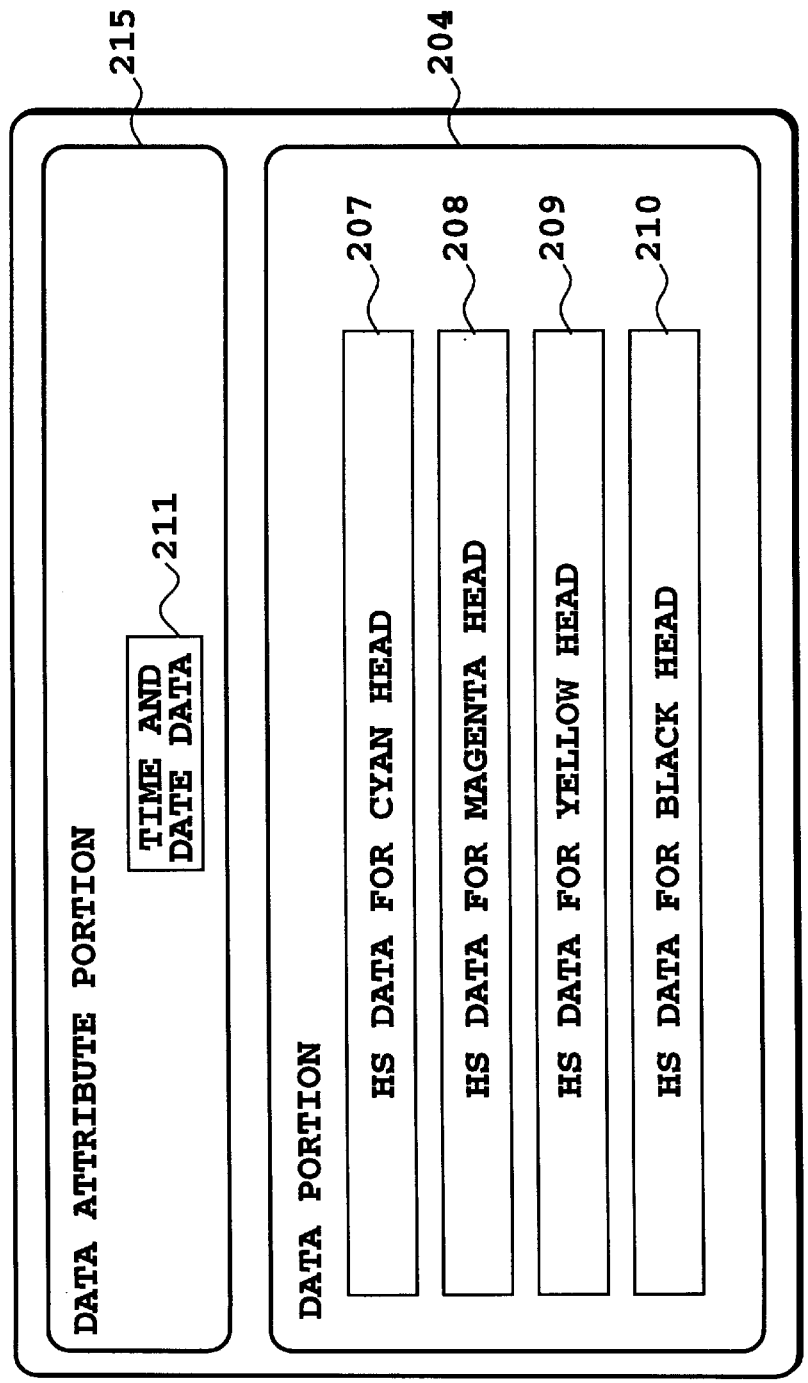
FIG. 21B is an explanatory illustration of the HS table is shown in FIG. 21A.

FIG. 20 is a flowchart for explaining a still further embodiment of the head shading processing operation using the same HS data as that in the seventh embodiment set forth above. In FIG. 20, a point different from the former ninth embodiment of FIG. 19 is that, when the printer ID is not retrieved at steps S503 and S504, the head shading process is skipped and the process is advanced to the color processing (step S509).

Eleventh Embodiment

FIGS. 21A, 21B, 22 and 23 are illustration for explaining the eleventh embodiment of the present invention. In the following description, like elements to those in the former embodiment will be identified by the same reference numeral, and the detailed description therefor will be neglected.

In the storage device 4, the HS data portion 204 and data attribute portion 215 are provided. The HS data portions 204 stores the HS data 207, 208, 209 and 210 of respective printing heads HC, HM, HY and HB of the printer 1 connected to the computer terminal device 2. The data attribute portion 215 stores the time and date data 211 indicative of time and date, at which the corresponding HS data is obtained. By the stored data in the HS data portion 204 and the data attribute portion 215, the HS table is established. In the printer 1, specific print setting value 212 for printing is set. The setting value 212 is the printing range or printing margin on the printing medium to be printed, for example.

Figure 22:
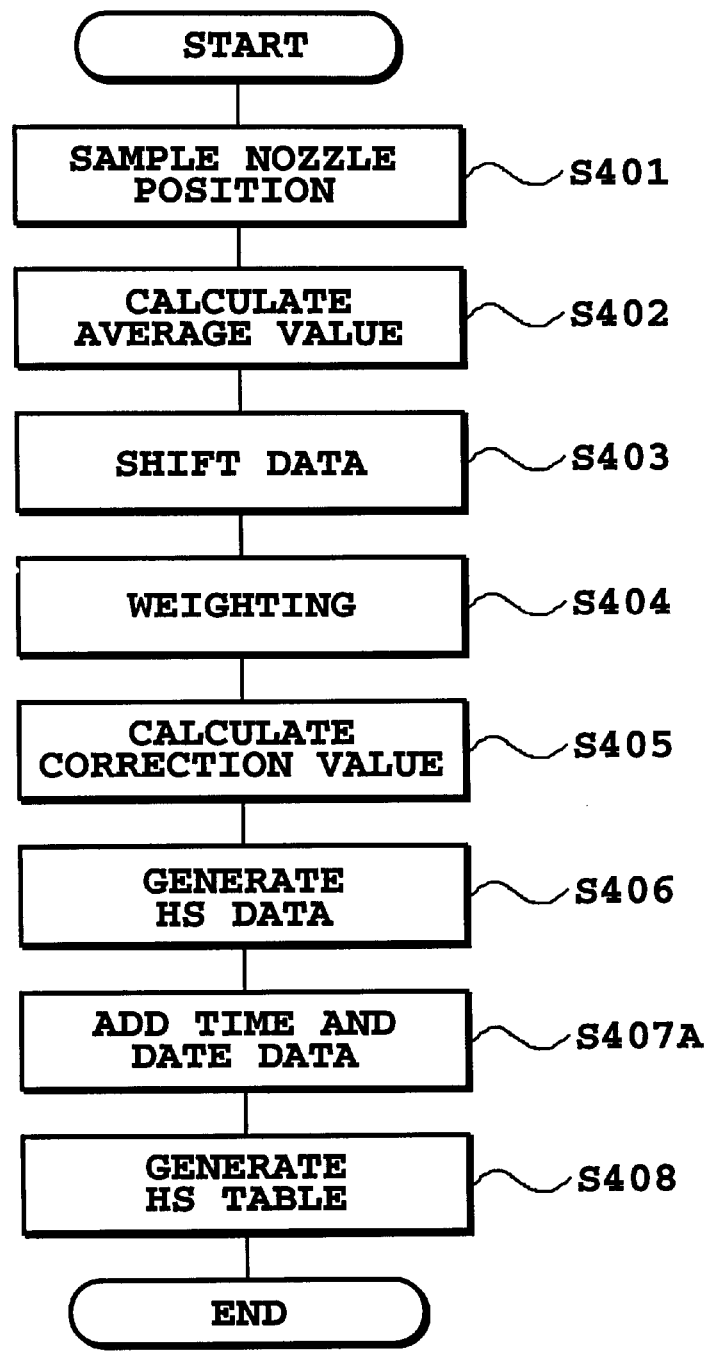
FIG. 22 is a flowchart for explaining a generating operation of a HS table in the eleventh embodiment of the present invention.

FIG. 22 is a flowchart for explaining operation for generating the HS data and HS table. In FIG. 22, a point different from the foregoing third embodiment illustrated in FIG. 10 is that the operation for adding the printer ID in FIG. 10 is neglected. In the shown embodiment, a specific printer 1 is connected to the computer terminal device 2, it is not necessary to identify the printer connected to the computer terminal device 2 among a plurality of the printers.

Figure 23:
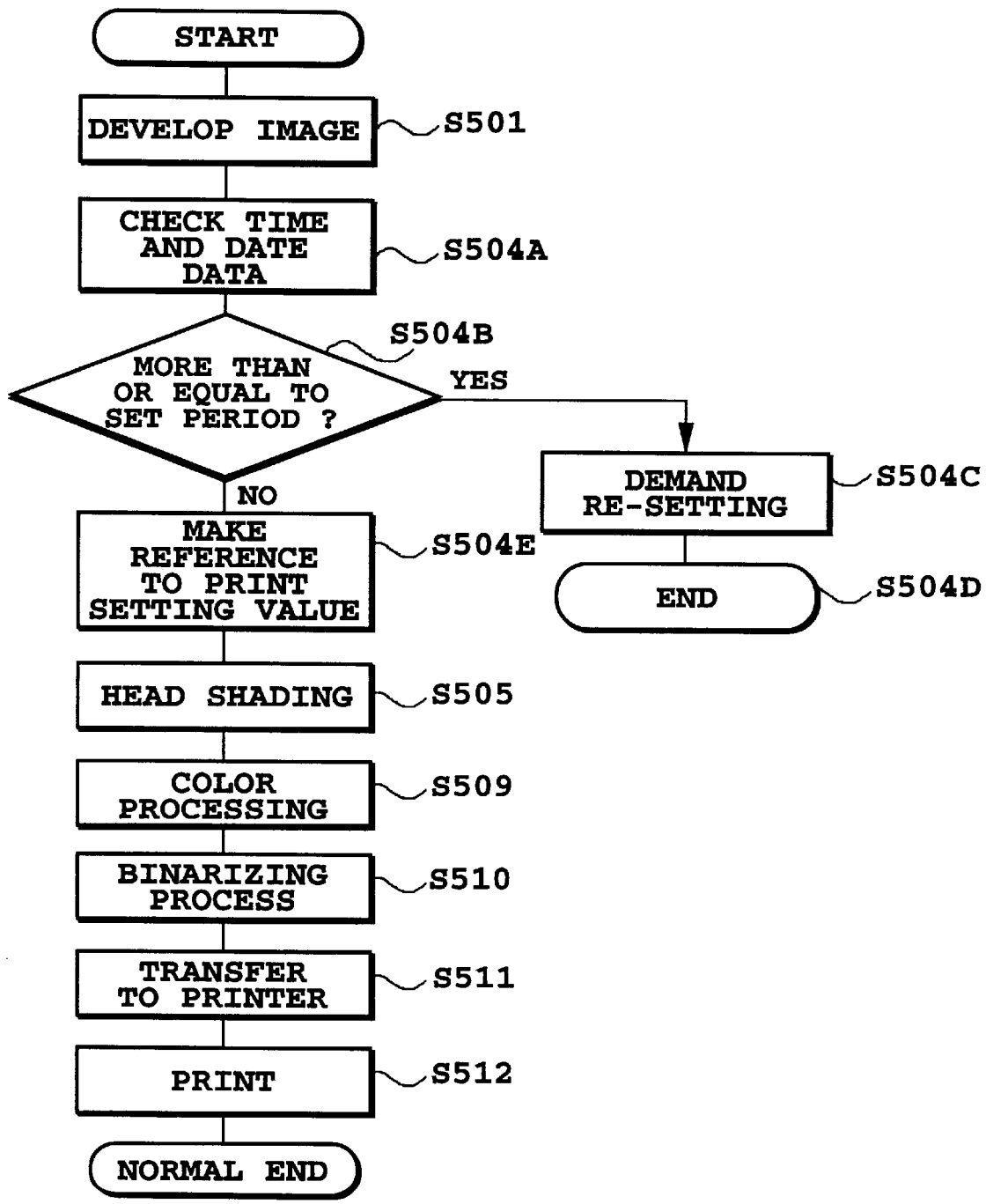
FIG. 23 is a flowchart for explaining a printing operation in the eleventh embodiment of the present invention.

FIG. 23 is an explanatory illustration of the operation of head shading process using the HS table. In FIG. 23, a point different from the third embodiment in FIG. 11 is that, the steps S502, S503, S504, S506 and S507 are neglected.

Twelfth Embodiment

Figure 24:
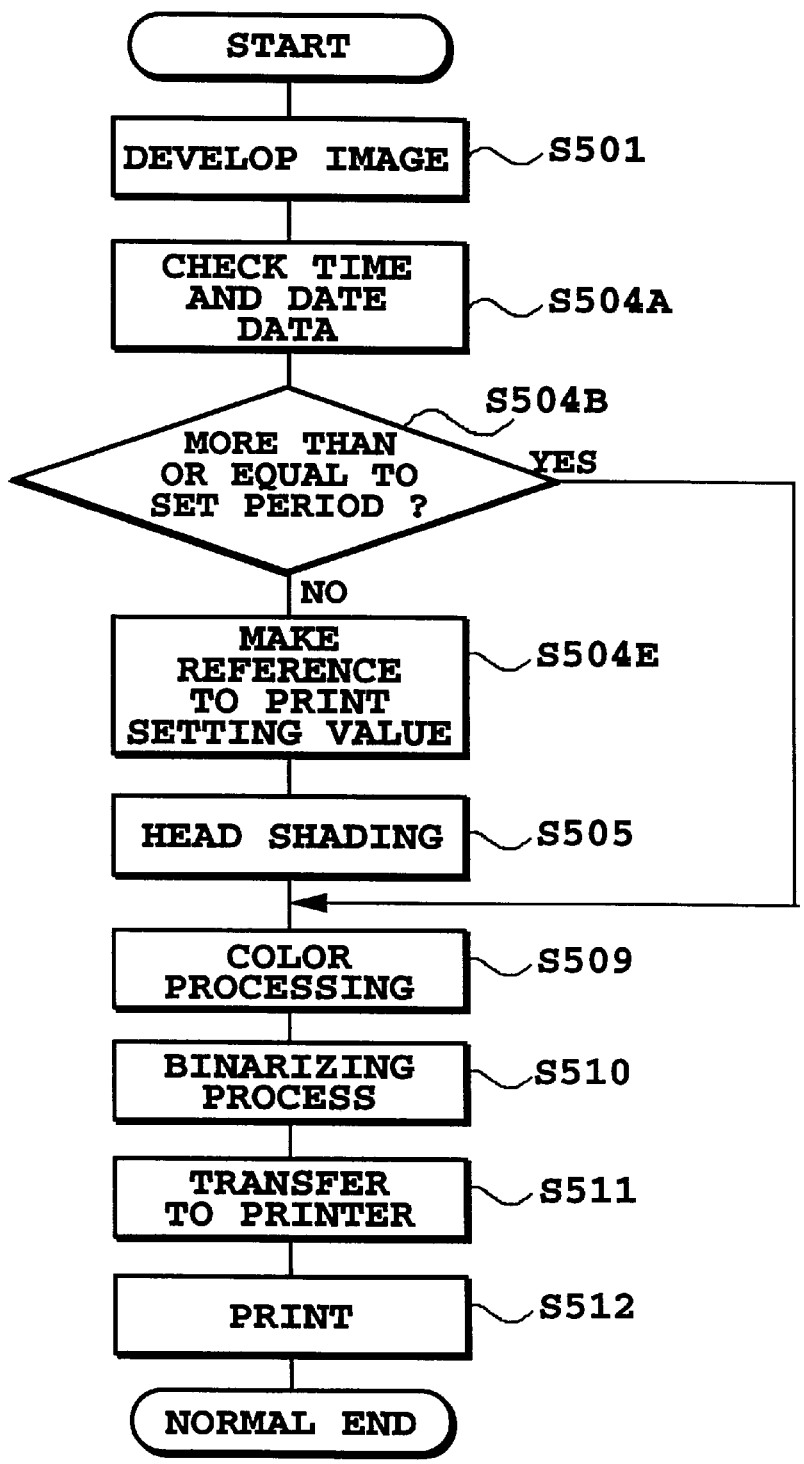
FIG. 24 is a flowchart for explaining a printing operation in the twelfth embodiment of the present invention.

FIG. 24 is a flowchart for explaining a yet further embodiment of the head shading processing operation using the same HS table as that in the eleventh embodiment. In FIG. 24, a point different from the eleventh embodiment of FIG. 22 is that, when a period more than or equal to a predetermined elapsed period has been elapsed after obtaining the HS data, the process is advanced from step S504B to the color processing (step 509). Accordingly, in this case, the head shading process (step S505) is skipped to avoid problem which can be caused by implementation with the old HS data.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. pat. Nos. 4,463,359 and 4,345,262 are preferable. In addition, it is preferable that the rate of temperature rise of the heating portions described in U.S. pat. No. 4,313,124 be adopted to achieve better recording.

U.S. pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

The present invention can be also applied to a so-called full-line type recording head whose length equals the maximum length across a recording medium. Such a recording head may consists of a plurality of recording heads combined together, or one integrally arranged recording head.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. As examples of the recovery system, are a capping means and a cleaning means for the recording head, and a pressure or suction means for the recording head. As examples of the preliminary auxiliary system, are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A printing method for selectively connecting a plurality of printers, each having a plurality of printing elements, to a control unit, and performing printing of an image on a printing medium by controlling the connected printer by said control unit, comprising the steps of:

storing correction data relative to control per printer available for connection with said control unit, in a storage device;

identifying the printer connected to said control unit to be controlled by said control unit, in accordance with an identification code corresponding to said printer and assigned to said printer;

reading out the correction data corresponding to the identified printer, from said storage device; and controlling the printer identified as the printer to be controlled using the read out correction data, wherein said correction data is correction data relating to a printing density corresponding to each of said printing elements of said printer.

2. A printing method as claimed in claim 1, wherein said correction data is derived on the basis of reading data of a result of printing when a predetermined density pattern of image is printed on said printing medium by said printer.

3. A printing method as claimed in claim 1, wherein said correction data is stored in said storage device with correspondence to said identification code, wherein, by retrieving said identification code, said correction data corresponding to the retrieved identification code is read out from said storage device.

4. A printing method as claimed in claim 3, wherein when said identification code is not retrieved from said storage device, the fact is displayed and control for the printer connected to said control unit as the object for control is interrupted.

5. A printing method as claimed in claim 3, wherein when said identification code is not retrieved from said storage device, control for the printer connected to said control unit as the object for control is maintained without using said correction data.

6. A printing method as claimed in claim 1, wherein a plurality of printing elements of said printer forms an ink-jet head ejecting an ink.

7. A printing method as claimed in claim 6, wherein said ink-jet head has an electrothermal transducer for generating film boiling in said ink for ejecting said ink.

8. A printing system for selectively connecting a plurality of printers, each printer having a plurality of printing elements, to a control unit, and performing printing of an image on a printing medium by controlling the connected printer by said control unit, comprising:

a storage device storing correction data relative to control per each printer available for connection with said control unit;

identifying means for identifying the printer connected to said control unit to be controlled by said control unit, in accordance with an identification code corresponding to said printer and assigned to said printer;

retrieving means for retrieving the correction data corresponding to the identified printer, from said storage device; and correction means for controlling the printer identified as the printer to be controlled using the read out correction data, wherein said correction data is correction data relating to a printing density corresponding to each of said printing elements of said printer.

9. A printing system as claimed in claim 8, wherein said printing system includes a reading device for reading a result of printing when said printer performs printing of a predetermined density pattern on said printing medium; and means for deriving said correction data on the basis of the read data of said reading device.

10. A printing system as claimed in claim 8, wherein said storage device stores said correction data with correspondence to said identification code, said retrieving means retrieving said identification code for reading out said correction data corresponding to the retrieved identification code from said storage device.

11. A printing system as claimed in claim 10, which further comprises a display means for announcing when said retrieving means fails to retrieve said identification code from said storage device, and means for interrupting control for the printer connected to said control unit as the object for control, when said retrieving means fails to retrieve said identification code from said storage device.

12. A printing system as claimed in claim 10, which further comprises means for continued control of the printer connected to said control unit as the object for control without using said correction data, when said retrieving means fails to retrieve said identification code from said storage device.

13. A printing system as claimed in claim 8, wherein a plurality of printing elements of said printer forms an ink-jet head ejecting an ink.

14. A printing system as claimed in claim 13, wherein said ink-jet head has an electrothermal transducer for generating film boiling in said ink for ejecting said ink.

15. A printing method for selectively connecting a plurality of printers, each having a plurality of printing elements, to a control unit, and performing printing of an image on a printing medium by controlling the connected printer by said control unit, comprising the steps of:

storing correction data relative to control per printer available for connection with said control unit, in a storage device;

identifying the printer connected to said control unit to be controlled by said control unit, in accordance with an identification code corresponding to said printer and assigned to said printer;

reading out the correction data corresponding to the identified printer, from said storage device;

controlling the printer identified as the printer to be controlled using the read out correction data, wherein said correction data is correction data relating to a printing density corresponding to each of said printing elements of said printer;

setting data relating to setting of a printing condition of said printer, provided in said printer;

identifying the printer connected to said control unit to be controlled by said control unit, on the basis of an identification code corresponding to said printer;

reading out the correction data corresponding to the printer identified as the object for control, from said storage device; and controlling the printer to be controlled using the read out correction data and said setting data of said printer as object for control.

16. A printing method as claimed in claim 15, wherein said correction data is derived on the basis of reading data of a result of printing when a predetermined density pattern of image is printed on said printing medium by said printer.

17. A printing method as claimed in claim 15, wherein printing is performed using a plurality of said printing elements arranged along the width direction of said printing medium with transporting said printing medium in the longitudinal direction upon printing an image on said printing medium;

said setting data is a set value of a printing region with respect to said printing medium; and said correction data is assigned for respective ones of said printing elements located within said printing region on the basis of said setting data.

18. A printing method as claimed in claim 15, wherein printing is performed using a plurality of said printing elements arranged along the width direction of said printing medium with transporting said printing medium in the longitudinal direction upon printing an image on said printing medium;

said setting data is a set value of a printing margin with respect to said printing medium; and said correction data is assigned for respective ones of said printing elements located out of said printing margin on the basis of said setting data.

19. A printing method as claimed in claim 15, further comprising a step of also storing a time and date on which said correction data is stored, in said storage device, wherein upon controlling the printer as the object for control using said correction data and said setting data, when a period longer than or equal to a predetermined period has elapsed from said stored time and date, the fact is displayed and control of the printer as the object for control is interrupted.

20. A printing method as claimed in claim 15, further comprising a step of also storing a time and date on which said correction data is stored, in said storage device, wherein, upon controlling the printer as the object for control using said correction data and said setting data, when a period longer than or equal to a predetermined period has elapsed from said stored time and date, control of the printer as the object for control is maintained without using said correction data and said setting data.

21. A printing system for selectively connecting a plurality of printers, each printer having a plurality of printing elements, to control unit, and performing printing of an image on a printing medium by controlling the connected printer by said control unit, comprising:

a storage device storing correction data relative to control per each printer available for connection with said control unit;

identifying means for identifying the printer connected to said control unit to be controlled by said control unit, in accordance with an identification code corresponding to said printer and assigned to said printer;

retrieving means for retrieving the correction data corresponding to the identified printer, from said storage device;

correction means for controlling the printer identified as the printer to be controlled using the read out correction data, wherein said correction data is correction data relating to a printing density corresponding to each of said printing elements of said printer; and setting means for setting data relating to setting of a printing condition of said printer, provided said printer, wherein said correction means corrects content of control for the printer to be controlled using said read out correction data and said setting data of the printer as object for control.

22. A printing system as claimed in claim 21, which further comprises:

transporting means for transporting said printing medium in the longitudinal direction, wherein:

said plurality of printing elements are arranged in the width direction of said printing medium, said setting means sets a set value of a printing region with respect to said printing medium as said setting data, and said correction means assigns said correction data for corresponding ones of said printing elements located within said printing region on the basis of said setting data.

23. A printing system as claimed in claim 21, which further comprises:

transporting means for transporting said printing medium in the longitudinal direction, wherein:

said plurality of printing elements are arranged in the width direction of said printing medium, said setting means sets a set value of a printing margin with respect to said printing medium as said setting data, and said correction means assigns said correction data for corresponding ones of said printing elements located out of said printing margin on said basis of the setting data.

24. A printing system as claimed in claim 21, wherein said storage device also stores a time and date on which said correction data is stored, wherein said printing system includes:

display means for displaying a fact upon controlling the printer as the object for control using said correction data and said setting data, when a period longer than or equal to a predetermined period has elapsed from said stored time and date, means for interrupting control for the printer as object for control, upon controlling the printer as the object for control using said correction data and said setting data, and when a period longer than or equal to a predetermined period has elapsed from said stored time and date.

25. A printing system as claimed in claim 21, wherein said storage device also stores a time and date on which said correction data is stored, and said printing system includes means for continued control of the printer as the object for control without using said correction data and said setting data, upon controlling the printer as the object for control using said correction data and said setting data, when a period longer than or equal to a predetermined period has elapsed from said stored time and date.

26. A printing method as claimed in claim 1, further comprising the steps of:

setting said correction data relating to control per each printer available for connection with said control unit and a time and date on which said correction data is stored, in said storage device;

identifying the printer connected to said control unit to be controlled by said control unit, on the basis of an identification code corresponding to said printer; and reading out the correction data corresponding to the printer identified as the object for control, from said storage devices, wherein, upon controlling the printer as the object for control using said correction data, when a period longer than or equal to a predetermined period has elapsed from said stored time and date, the fact is displayed and control of the printer as the object for control is interrupted.

27. A printing method as claimed in claim 1, further comprising the steps of:

setting said correction data relating to control per each printer available for connection with said control unit and a time and date on which said correction data is stored, in said storage device;

identifying the printer connected to said control unit to be controlled by said control unit, on the basis of an identification code corresponding to said printer; and reading out the correction data corresponding to the printer identified as the object for control, from said storage device, wherein, upon controlling the printer as the object for control using said correction data, when a period longer than or equal to a predetermined period has elapsed from said stored time and date, control of the printer as the object for control is maintained without using said correction data.

28. A printing system as claimed in claim 8, wherein said storage device stores said correction data relating to control per each printer connected to said control unit and a storage time and date, on which said correction data is stored, and said printing system further comprises:

display means for displaying a fact upon controlling the printer as the object for control using said correction data, when a period longer than or equal to a predetermined period has elapsed from said stored time and date, and means for interrupting control for the printer as object for control, upon controlling the printer as the object for control using said correction data and said setting data, and when a period longer than or equal to a predetermined period has elapsed from said stored time and date.

29. A printing system as claimed in claim 8, wherein said storage device stores said correction data relating to control per each printer connected to said control unit and a storage time and date, on which said correction data is stored, and said printing system includes means for continued control of the printer as the object for control without using said correction data, upon controlling the printer as the object for control using said correction data, when a period longer than or equal to a predetermined period has elapsed from said stored time and date.

30. A printing method for printing an image on a printing medium using a printer having a plurality of printing elements controlled by a control unit, said method comprising the steps of:

storing correction data relating to control of said printer and a storage time and date, on which said correction data is stored, in a storage device;

reading out said correction data and said storage time and date upon controlling said printer, from said storage device;

controlling said printer using said correction data when an elapsed time from said storage time and date is not more than or equal to a predetermined period; and interrupting control of said printer when an elapsed time from said storage time and date is more than or equal to a predetermined period, wherein said correction data is correction data relating to a printing density corresponding to each of said printing elements of the printer.

31. A printing method as claimed in claim 30, wherein said printer sets setting data relating to setting of a printing condition of said printer; and said printer is controlled using said setting data when said printer is controlled using said correction data.

32. A printing method as claimed in claim 31, wherein printing is performed using a plurality of printing elements arranged in the width direction of said printing medium and said printing medium is transported in a longitudinal direction upon printing an image on said printing medium, said setting data is a set value of a printing region with respect to said printing medium, and said correction data is assigned for respective ones of said printing elements located within said printing region on the basis of said setting data.

33. A printing method as claimed in claim 31, wherein printing is performed using a plurality of printing elements arranged in the width direction of said printing medium said printing medium is transported in a longitudinal direction upon printing an image on said printing medium, said setting data is a set value of a printing margin with respect to said printing medium, and said correction data is assigned for respective ones of said printing elements located out of said printing margin on the basis of said setting data.

34. A printing method for printing an image on a printing medium using a printer controlled by a control unit, said method comprising the steps of:

storing correction data relating to control of said printer and storage time and date, on which said correction data is stored, in a storage device;

reading out said correction and said storage time and date upon controlling said printer, from said storage device;

controlling said printer using said correction data when an elapsed time from said storage time and date is not more than or equal to a predetermined period; and continuing control of said printer without using said correction data when an elapsed time from said storage time and data is more than or equal to a predetermined period, wherein said correction data is correction data relating to a printing density corresponding to each of said Printing elements-of the printer.

35. A printing method as claimed in claim 34, wherein said printer sets setting data relating to setting of a printing condition of said printer; and said printer is controlled using said setting data when said printer is controlled using said correction data.

36. A printing method as claimed in claim 35, wherein printing is performed using a plurality of said printing elements arranged in width direction of said printing medium and said printing medium is transported in a longitudinal direction upon printing an image on said printing medium, said setting data is a set value of a printing region with respect to the printing medium; and said correction data is assigned for respective ones of said printing elements located within said printing region on the basis of said setting data.

37. A printing method as claimed in claim 35, wherein printing is performed using a plurality of said printing elements arranged in width direction of said printing medium and said printing medium is transported in a longitudinal direction upon printing an image on said printing medium, said setting data is a set value of a printing margin with respect to the printing medium; and said correction data is assigned for respective ones of said printing elements located out of said printing margin on the basis of said setting data.

38. A printing system for printing an image on a printing medium using a printer having a plurality of printing elements controlled by a control unit, comprising:

a storage device for storing correction data relating to control of said printer and a storage time and date, on which said correction data is stored;

reading means for reading out said correction data and said storage time and date from said storage device upon controlling said printer;

means for controlling said printer using said correction data when an elapsed time from said storage time and date is not more than or equal to a predetermined period;

means for demanding resetting said correction data when an elapsed time from said storage time and date is more than or equal to a predetermined period; and means for interrupting control for said printer when an elapsed time from said storage time and date is more than or equal to a predetermined period, wherein said correction data is correction data relating to a printing density corresponding to each of said printing elements of said printer.

39. A printing system as claimed in claim 38, which further comprises:

setting means for setting data relating to setting of a printing condition of said printer provided in said printer; and means for controlling said printer using said setting data when said printer is controlled using said correction data.

40. A printing system as claimed in claim 39, which further comprises:

transporting means for transporting said printing medium in the longitudinal direction, said plurality of printing elements being arranged in width direction of said printing medium, wherein:

said setting means sets said setting data as a value of a printing region with respect to said printing medium; and said correction means assigns said correction data to corresponding ones of said printing elements located within said printing region on the basis of said setting data.

41. A printing system as claimed in claim 39, which further comprises:

transporting means for transporting said printing medium in the longitudinal direction, said plurality of printing elements being arranged in width direction of said printing medium, wherein:

said setting means sets said setting data as a value of a printing margin with respect to said printing medium; and said correction means assigns said correction data to corresponding ones of said printing elements located out of said printing margin on the basis of said setting data.

42. A printing system for printing an image on a printing medium using a printer having a plurality of printing elements controlled by a control unit, comprising:

a storage device for storing correction data relating to control of said printer and a storage time and date, on which said correction data is stored;

reading means for reading out said correction data and said storage time and date from said storage device upon controlling said printer;

means for controlling said printer using said correction data when an elapsed time from said storage time and date is not more than or equal to a predetermined period; and means for continuing control of said printer without using said correction data when an elapsed time from said storage time and date is more than or equal to a predetermined period, wherein said correction data is correction data relating to a printing density corresponding to each of said printing elements of said printer.

43. A printing system as claimed in claim 42, which further comprises:

setting means for setting data relating to the setting of the printing condition of said printer, provided in said printer; and means for controlling said printer using said setting data when said printer is controlled using said correction data.

44. A printing system as claimed in claim 43, which further comprises:

transporting means for transporting said printing medium in the longitudinal direction, said plurality of printing elements being arranged in width direction of said printing medium, wherein:

said setting means sets said setting data as a value of said printing region with respect to said printing medium; and said correction means assigns said correction data to corresponding ones of said printing elements located within said printing region on the basis of said setting data.

45. A printing system as claimed in claim 43, which further comprises:

transporting means for transporting said printing medium in the longitudinal direction, said plurality of printing elements being arranged in width direction of said printing medium, wherein:

said setting means sets said setting data as a value of a printing margin with respect to said printing medium; and said correction means assigning said correction data to corresponding ones of said printing elements located out of said printing margin on the basis of said setting data.

* * * * *

UNITED STATES PATENT AND TRADEMARK OFFICE
CERTIFICATE OF CORRECTION

PATENT NO.    : 6,188,486 B1
DATED         : February 13, 2001
INVENTOR(S)   : Yamada It is certified that error appears in the above-identified patent and that said Letters Patent is hereby corrected as shown below:

Title page,
Item [22], Filed: "June 16, 1997" should read -- June 17, 1997 --;

Item [56], References Cited, under U.S. PATENT DOUMENTS, insert:
-- 5,416,596    5/1995  Suzuki et al.      358/298
   6,035,103    3/2000  Zuber              358/1.9
   5,805,777    9/1998  Kuchta             358/1.13
   5,319,391    3/2000  Takahasi et al.    347/184 --; and Item [57], ABSTRACT,
Line 1, "Printers" should read -- A printer --.

Column 1,
Line 17, "as" should be deleted;
Line 21, "in" should read -- is --;
Line 25, "reading" should read -- reading as --;
Line 42, "respective of the" should read -- the respective --;
Line 45, "by" should read -- by the --;
Line 46, "of the" should be deleted;
Line 51, "in" should read -- in the -- and "of the" should be deleted; and
Line 55, "avoided" should read -- avoiding --.

Column 2,
Line 3, "other" should read -- another --; and
Line 31, "whereby" should read -- which thereby --.

Column 3,
Line 34, "data" should read -- date -- and "than" should read -- is not more than --; and
Line 55, "with" should read -- by --.

Column 4,
Line 5, "control" should read -- controlling --;
Line 6, "with" should read -- by --;
Line 12, "control" should read -- controlling --;
Line 13, "with" should read -- by --;
Line 22, "past." should read -- passed. --;
Line 29, "be" should read -- the --;
Line 53, "is" should read -- as --; and
Line 58, "is" should read -- as --. (second occurrence)

UNITED STATES PATENT AND TRADEMARK OFFICE
CERTIFICATE OF CORRECTION

PATENT NO. : 6,188,486 B1
DATED : February 13, 2001
INVENTOR(S) : Yamada

It is certified that error appears in the above-identified patent and that said Letters Patent is hereby corrected as shown below:

Column 5,
Line 9, "is" should read -- as --;
Line 23, "is" should read -- as --;
Line 45, "essary" should read -- essarily -- and "obscure" should read -- obscuring --;
Line 57, "denote" should read -- denotes --; and
Line 66, "generation" should read -- generating --.

Column 6,
Line 4, "each" should read -- each of --;
Line 20, "of" should be deleted;
Line 25, "of" should be deleted and "each" should read -- each of --;
Line 33, "is" should read -- are --; and
Line 36, "show" should read -- shows --.

Column 7,
Line 13, "where" should read -- there --;
Line 14, "is" (second occurrence) should be deleted; and
Line 66, "uniform." should read -- uniform is implemented. --.

Column 8,
Line 17, "is" should read -- is a --;
Line 25, "it is" should read -- are --;
Line 26, "printer" should read --processes --;
Line 36, "processed" should read --processes --;
Line 41, "illustration" should read -- illustrations --;
Line 52, "arrange" should read -- arrangement --; and
Line 59, "they" should be deleted.

Column 9,
Line 7, "process goes end" should read -- the process ends --; and
Line 57, "problem" should read -- problems --.

Column 10,
Line 26, "process goes end" should read -- the process ends --; and
Line 57, "problem" should read -- problems --.

Column 11,
Line 2, "illustration" should read -- illustrations --;
Line 9, "portions" should read -- portion --;
Line 26, insert -- and therefore, -- after "2,"; and
Line 43, "lem" should read -- lems --.

UNITED STATES PATENT AND TRADEMARK OFFICE
CERTIFICATE OF CORRECTION

PATENT NO.    : 6,188,486 B1
DATED         : February 13, 2001
INVENTOR(S)   : Yamada It is certified that error appears in the above-identified patent and that said Letters Patent is hereby corrected as shown below:

<u>Column 12,</u>
Line 31, "consists" should read -- consist --.

<u>Column 16,</u>
Line 35, "setting" (second occurrence) should read -- setting setting --.

<u>Column 18,</u>
Line 59, "medium said" should read -- medium, said --.

<u>Column 19,</u>
Line 15, "data" should read -- date --;
Line 19, "Print-" should read -- print --; and
Line 20, "elements-of" should read -- elements of --.

<u>Column 20,</u>
Lines 9 and 65, "setting" (second occurrence) should read -- setting setting --.

Signed and Sealed this

Thirteenth Day of August, 2002

*Attest:*

JAMES E. ROGAN
*Attesting Officer*    *Director of the United States Patent and Trademark Office*